US011960655B2

(12) United States Patent
Cho et al.

(10) Patent No.: US 11,960,655 B2
(45) Date of Patent: Apr. 16, 2024

(54) METHOD OF RECOGNIZING GESTURE BY USING WEARABLE DEVICE AND THE WEARABLE DEVICE

(71) Applicant: SAMSUNG ELECTRONICS CO., LTD., Suwon-si (KR)

(72) Inventors: Keunseok Cho, Suwon-si (KR); Yusun Son, Suwon-si (KR); Jiwon Hyung, Suwon-si (KR); Dojun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/075,900

(22) Filed: Dec. 6, 2022

(65) Prior Publication Data

US 2023/0185381 A1 Jun. 15, 2023

Related U.S. Application Data

(63) Continuation of application No. PCT/KR2022/017796, filed on Nov. 11, 2022.

(30) Foreign Application Priority Data

Dec. 9, 2021 (KR) .......................... 10-2021-0176116

(51) Int. Cl.
*G06F 3/01* (2006.01)
*G06F 1/16* (2006.01)

(52) U.S. Cl.
CPC .............. *G06F 3/017* (2013.01); *G06F 1/163* (2013.01); *G06F 3/015* (2013.01)

(58) Field of Classification Search
CPC ....................................................... G06F 3/017
See application file for complete search history.

(56) References Cited

U.S. PATENT DOCUMENTS 9,278,453 B2 3/2016 Assad
9,811,648 B2 11/2017 Choi et al.
(Continued)

FOREIGN PATENT DOCUMENTS

CN 113729738 A 12/2021
JP 2021-511126 A 5/2021
(Continued)

OTHER PUBLICATIONS

McIntosh et al., "EMPress: Practical Hand Gesture Classification with Wrist-Mounted EMG and Pressure Sensing," Proceedings of the 34th Annual ACM Conference on Human Factors in Computing Systems (CHI'16), pp. 2332-2342, May 2016, Total 12 pages.
(Continued)

*Primary Examiner* — Gustavo Polo
(74) *Attorney, Agent, or Firm* — Sughrue Mion, PLLC

(57) ABSTRACT

Provided is a method and device for recognizing, by a wearable device, a gesture. The method of recognizing, by a wearable device, a user gesture includes identifying a trigger gesture of the wearable device, obtaining an electromyographic signal set from a plurality of electromyography sensors, based on a movement of a user's body for the identified trigger gesture, obtaining at least one output value by using one or more electromyographic signals from among the obtained electromyographic signal set, as an input to a gesture recognition model, selecting, based on the wearable device being in a standby mode, at least one active electromyography sensor to recognize the user gesture, based on the obtained output value, activating the selected active electromyography sensor and recognizing the user gesture by using the activated at least one active electromyography sensor based on the wearable device being in standby mode.

20 Claims, 15 Drawing Sheets

(56) References Cited

U.S. PATENT DOCUMENTS

| | | |
|---|---|---|
| 9,977,509 B2 | 5/2018 | Park et al. |
| 10,019,067 B2 | 7/2018 | Yoon et al. |
| 10,488,831 B2 | 11/2019 | Trott et al. |
| 10,534,900 B2 | 1/2020 | Cheong et al. |
| 11,106,273 B2 | 8/2021 | Hazra et al. |
| 2014/0240103 A1 | 8/2014 | Lake et al. |
| 2015/0277575 A1 | 10/2015 | Ataee et al. |
| 2015/0288796 A1* | 10/2015 | Choi ................ G06F 3/017 455/557 |
| 2017/0265780 A1 | 9/2017 | Lee et al. |
| 2021/0362005 A1 | 11/2021 | Kosaka et al. |

FOREIGN PATENT DOCUMENTS

| | | |
|---|---|---|
| KR | 10-0554173 B1 | 2/2006 |
| KR | 10-2015-0099430 A | 8/2015 |
| KR | 10-2016-0096902 A | 8/2016 |
| KR | 10-1727896 B1 | 5/2017 |
| KR | 10-2017-0083403 A | 7/2017 |
| KR | 10-1824921 B1 | 2/2018 |
| KR | 10-2018-0086547 A | 8/2018 |
| KR | 10-2020-0075107 A | 6/2020 |

OTHER PUBLICATIONS

International Search Report and Written Opinion dated Feb. 14, 2023 by the International Searching Authority in counterpart International Patent Application No. PCT/KR2022/017796. (PCT/ISA/220, PCT/ISA/210 and PCT/ISA/237).

* cited by examiner

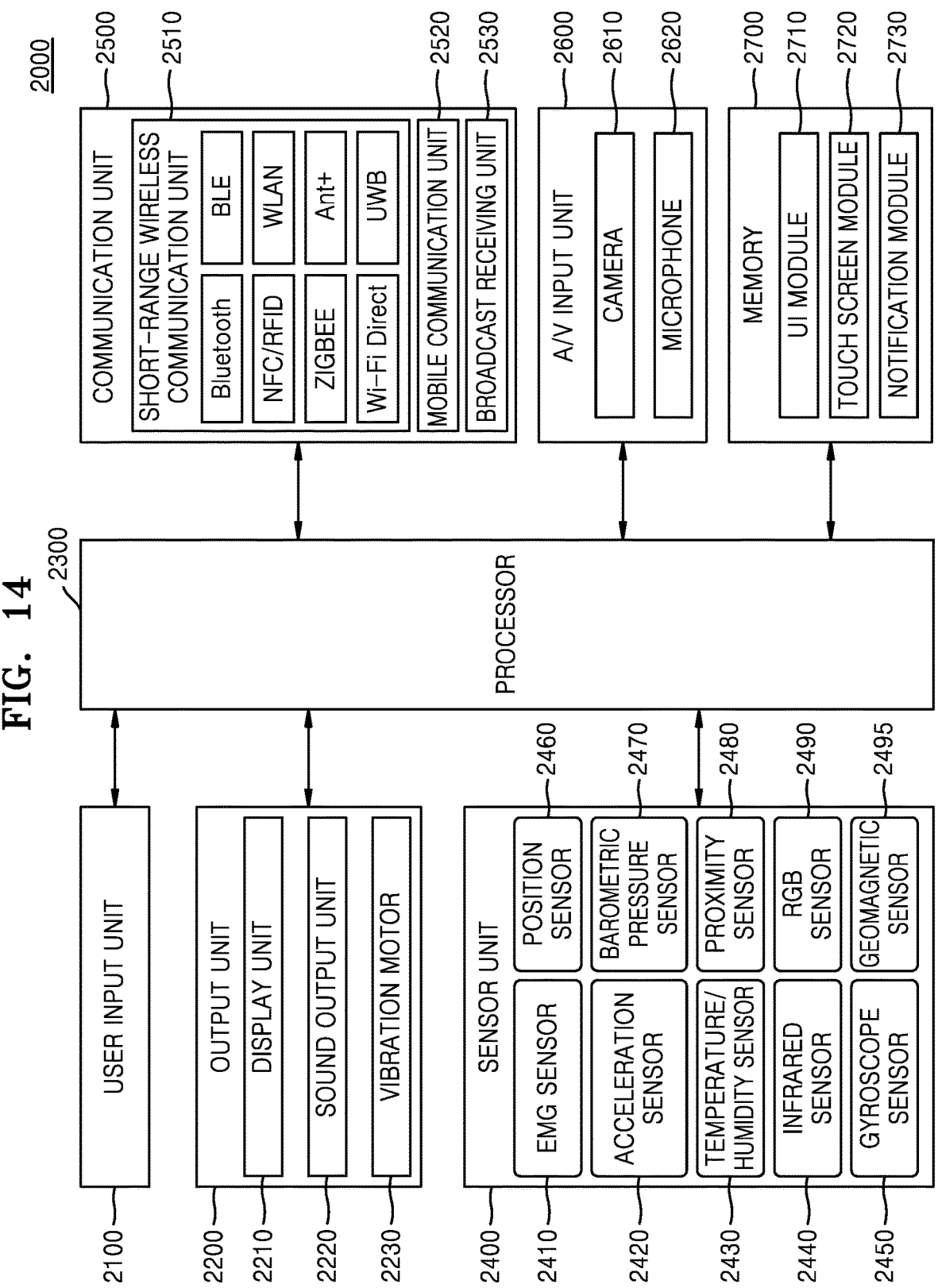

METHOD OF RECOGNIZING GESTURE BY USING WEARABLE DEVICE AND THE WEARABLE DEVICE

CROSS-REFERENCE TO RELATED APPLICATION(S)

This application is a bypass continuation of International Application No. PCT/KR2022/017796, filed on Nov. 11, 2022, which is based on and claims priority to Korean Patent Application No. 10-2021-0176116, filed on Dec. 9, 2021, in the Korean Intellectual Property Office, the disclosures of which are incorporated by reference herein in their entireties.

TECHNICAL FIELD

The disclosure relates to a wearable device and a method of recognizing a gesture by using a wearable device.

BACKGROUND

Recently, wearable devices, such as smart watches or wrist bands, are capable of measuring signals by using various sensors. However, the wearable devices continuously consume power to collect information by using various sensors. In particular, the wearable devices are equipped with a relatively small battery capacity, and thus, there is a demand for a technology to efficiently manage the power consumption of sensors used to recognize a user gesture.

Technical Problem

Provided are a method(s) of measuring electromyographic signals by using some of a plurality of electromyography sensors when a wearable device is in a standby mode, to reduce power consumption by the electromyography sensors, and the wearable device.

SUMMARY

According to an aspect of the disclosure, a method of recognizing, by a wearable device, a user gesture may include identifying a trigger gesture of the wearable device, the trigger gesture being a gesture that activates one or more inactive electromyography sensors, obtaining an electromyographic signal set from a plurality of electromyography sensors, based on a movement of a user's body for the identified trigger gesture, obtaining at least one output value by using one or more electromyographic signals from among the obtained electromyographic signal set, as an input to a gesture recognition model, selecting, based on the obtained at least one output value, at least one active electromyography sensor to recognize the user gesture when the wearable device is in a standby mode, activating the selected at least one active electromyography sensor based on the wearable device being in standby mode, and recognizing the user gesture by using the activated at least one active electromyography sensor based on the wearable device being in standby mode.

According to another aspect of the disclosure, a wearable device worn by a user and configured to recognize a user gesture may include a plurality of electromyography sensors, a memory storing one or more instructions, and a processor configured to identify a trigger gesture of the wearable device, the trigger gesture being a gesture that activates one or more inactive electromyography sensors, obtain a electromyographic signal set from the a plurality of electromyography sensors, based on a movement of the user's body for the identified trigger gesture, obtain at least one output value by using one or more electromyographic signals from among the obtained electromyographic signal set, as an input to a gesture recognition model, select, based on the obtained at least one output value, at least one active electromyography sensor to recognize the user gesture when the wearable device is in a standby mode, control to activate the selected at least one active electromyography sensor based on the wearable device being in standby mode, and recognize the user gesture by using the activated at least one active electromyography sensor based on the wearable device being in standby mode.

According to another aspect of the disclosure, a computer-readable recording medium may have recorded thereon a program for executing, on a computer, the above-described method.

The standby power of a wearable device may be reduced by selecting some of or a subset of a plurality of electromyography sensors of the wearable device, and activating the selected some electromyography sensors when the wearable device is in a standby mode.

BRIEF DESCRIPTION OF DRAWINGS

FIG. 14 is a block diagram showing the configuration of a wearable device according to an embodiment of the disclosure.

DETAILED DISCLOSURE

Figure 1:
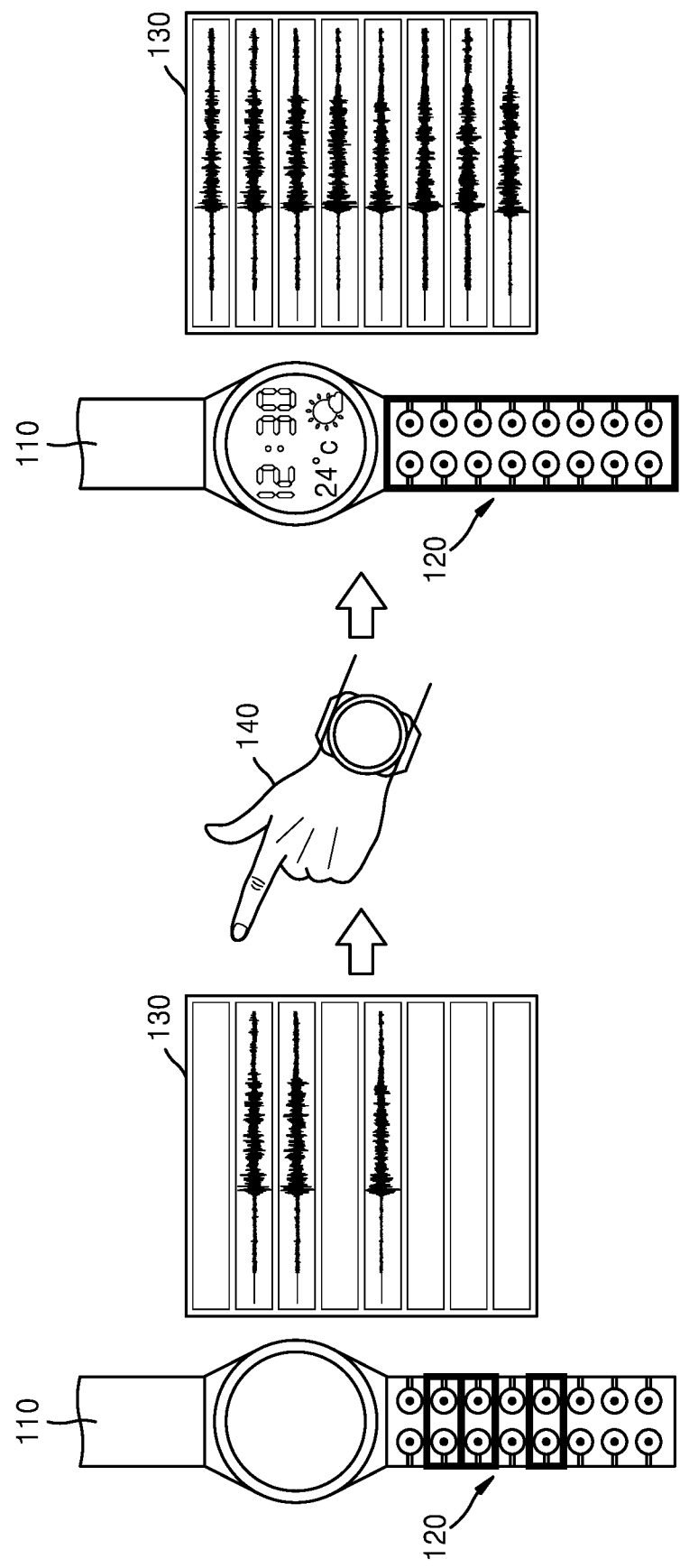
FIG. 1 illustrates an example of a plurality of electromyography sensors of a wearable device activated by a trigger gesture, according to an embodiment of the disclosure.

The disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein In the drawings, for a more clear description of the disclosure, parts or units that are not related to the disclosure are omitted, and throughout the drawings, like reference numerals denote like elements.

In the entire specification, a "gesture" may mean user's motions including body motions or hand motions. For example, when all of user's fingers are grasped, it may be interpreted as a "rock" gesture.

In the entire specification, a "trigger gesture" may be understood as a gesture to additionally activate electromyography sensors that are not activated, among the electromyography sensors of a wearable device. According to an embodiment of the disclosure, a wearable device may further activate, in response to the identified user gesture being a trigger gesture, electromyography sensors that are not activated, among a plurality of electromyography sensors of a wearable device.

In the entire specification, "active electromyography (EMG) sensors" may be understood as sensors that are activated when a wearable device is in a standby mode, among a plurality of EMG sensors. According to an embodiment of the disclosure, when a wearable device is in a standby mode, a wearable device may obtain EMG signals by active EMG sensors of a plurality of EMG sensors.

In the entire specification, a "standby mode" may be understood as a mode in which only a subset of a plurality of EMG sensors of a wearable device are activated. According to an embodiment of the disclosure, the standby mode may be a mode in which a small amount of power is supplied to a wearable device. For example, the standby mode may be a mode in which only a display or essential ones of a plurality of EMG sensors of a wearable device are activated. According to an embodiment of the disclosure, the standby mode may be a mode in which a specific function of a wearable device is performed, and only a subset of a plurality of EMG sensors of a wearable device are activated. For example, when a user executes an exercise measurement application on a wearable device, a specific subset of a plurality of EMG sensors of a wearable device may be activated.

In the entire specification, an "EMG signal set" may be understood as a set of EMG signals that are obtained through a plurality of EMG sensors of a wearable device. According to an embodiment of the disclosure, an EMG signal set may be a set of EMG signals obtained through the activated EMG sensors of a wearable device. For example, an EMG signal set may include a set of EMG signals obtained by the active EMG sensors when a wearable device is in a standby mode. According to an embodiment of the disclosure, an EMG signal set may include EMG signals obtained together through a plurality of EMG sensors.

In the entire specification, a "candidate EMG sensor set," as a set of at least one EMG sensors of a plurality of EMG sensors of a wearable device, may be understood as a set of EMG sensors that are candidates of the active EMG sensors. According to an embodiment of the disclosure, a wearable device may select one of a plurality of candidate EMG sensor sets, and may select EMG sensors included in the selected candidate EMG sensor set, as active EMG sensors.

In the entire specification, an "input signal set," as a signal set input to a gesture recognition model, may be understood as a signal set including EMG signals obtained through the candidate EMG sensor set. According to an embodiment of the disclosure, an input signal set may be a set of signals obtained by preprocessing the EMG signals obtained through the candidate EMG sensor set.

In the entire specification, when a portion is referred to as being connected to another portion, it can be directly connected to the other portion or electrically connected to the other portion via an intervening portion. Furthermore, it will be further understood that, when a portion "comprises" a constituent element, unless stated otherwise, the presence or addition of one or more other features or components is not precluded.

Hereinafter, the disclosure is described in detail with reference to the accompanying drawings.

FIG. 1 illustrates an example in which a plurality of EMG sensors 120 of a wearable device 110 are activated by a trigger gesture 140, according to an embodiment of the disclosure.

Referring to FIG. 1, the wearable device 110 may include the EMG sensors 120. For example, the wearable device 110 may include eight EMG sensors 120, but the disclosure is not limited thereto. According to an embodiment of the disclosure, each of the EMG sensors 120 of the wearable device 110 may include two electrodes.

The wearable device 110 may obtain an EMG signal set 130 including user's EMG signals obtained through the EMG sensors 120. According to an embodiment of the disclosure, the EMG signal set 130 may include EMG signals obtained through one or more activated EMG sensors among the EMG sensors 120 of the wearable device 110. For example, when there are eight activated EMG sensors of the wearable device 110, the EMG signal set 130 may include eight EMG signals. According to an embodiment of the disclosure, the EMG signal set 130 may include EMG signals simultaneously obtained through the EMG sensors 120.

For convenience of explanation, for example, a first EMG sensor may mean an EMG sensor of the wearable device 110 closest to a display of the wearable device 110, in a strap extending from the display, but the disclosure is not limited thereto. Furthermore, for example, in the strap of the wearable device 110, a second EMG sensor and a third EMG sensor may be sequentially arranged next to the first EMG sensor. For convenience of explanation, for example, a first EMG signal may mean an EMG signal obtained through the first EMG sensor, indicating one displayed at the top in the EMG signal set 130, but the disclosure is not limited thereto. Furthermore, for example, a second EMG signal, a third EMG signal, and the like may mean EMG signals obtained through the second EMG sensor, the third EMG sensor, and the like, respectively.

According to an embodiment of the disclosure, when the wearable device 110 is in a standby mode, only some or a subset of one or more EMG sensors may be activated among the EMG sensors 120. The wearable device 110 may use less power when the wearable device 110 is in a standby mode, by activating only some of the EMG sensors 120. For example, when a user is not using the wearable device 110, to reduce power consumption, the wearable device 110 may activate only the second, third, and fifth EMG sensors among the eight EMG sensors 120, but the disclosure is not limited thereto. According to an embodiment of the disclosure, the EMG sensors that are activated when the wearable device 110 is in a standby mode, may be EMG sensors selected from among the EMG sensors 120, to increase a prediction probability of the trigger gesture 140.

According to an embodiment of the disclosure, when the wearable device 110 is in a standby mode, the wearable device 110 may obtain the EMG signal set 130 through some activated EMG sensors. For example, the wearable device 110 may obtain the EMG signal set 130 including the second, third, and fifth EMG signals through the second, third, and fifth EMG sensors 120 that are activated, but the disclosure is not limited thereto.

Furthermore, the wearable device 110 may identify a user gesture based on the EMG signal set 130 obtained through some activated EMG sensors. According to an embodiment of the disclosure, the EMG signal set 130 that is obtained may include analog signals or digital signals.

Furthermore, when the identified user gesture corresponds to the trigger gesture 140, the wearable device 110 may additionally activate the EMG sensors 120 that are not activated. For example, when the trigger gesture 140 is "scissors," in response to the identified user gesture that corresponds to "scissors," the wearable device 110 may additionally activate some of the EMG sensors 120. For example, first, fourth, and sixth to eighth EMG sensors may be additionally activated, but the disclosure is not limited thereto. The wearable device 110 may obtain the EMG signal set 130 including EMG signals, from the EMG sensors 120 that are additionally activated.

Furthermore, according to an embodiment of the disclosure, when the identified user gesture corresponds to the trigger gesture 140, the wearable device 110 may additionally perform a specific function. For example, when the user gesture corresponds to the trigger gesture 140, the display of the wearable device 110 may be activated.

Figure 2:
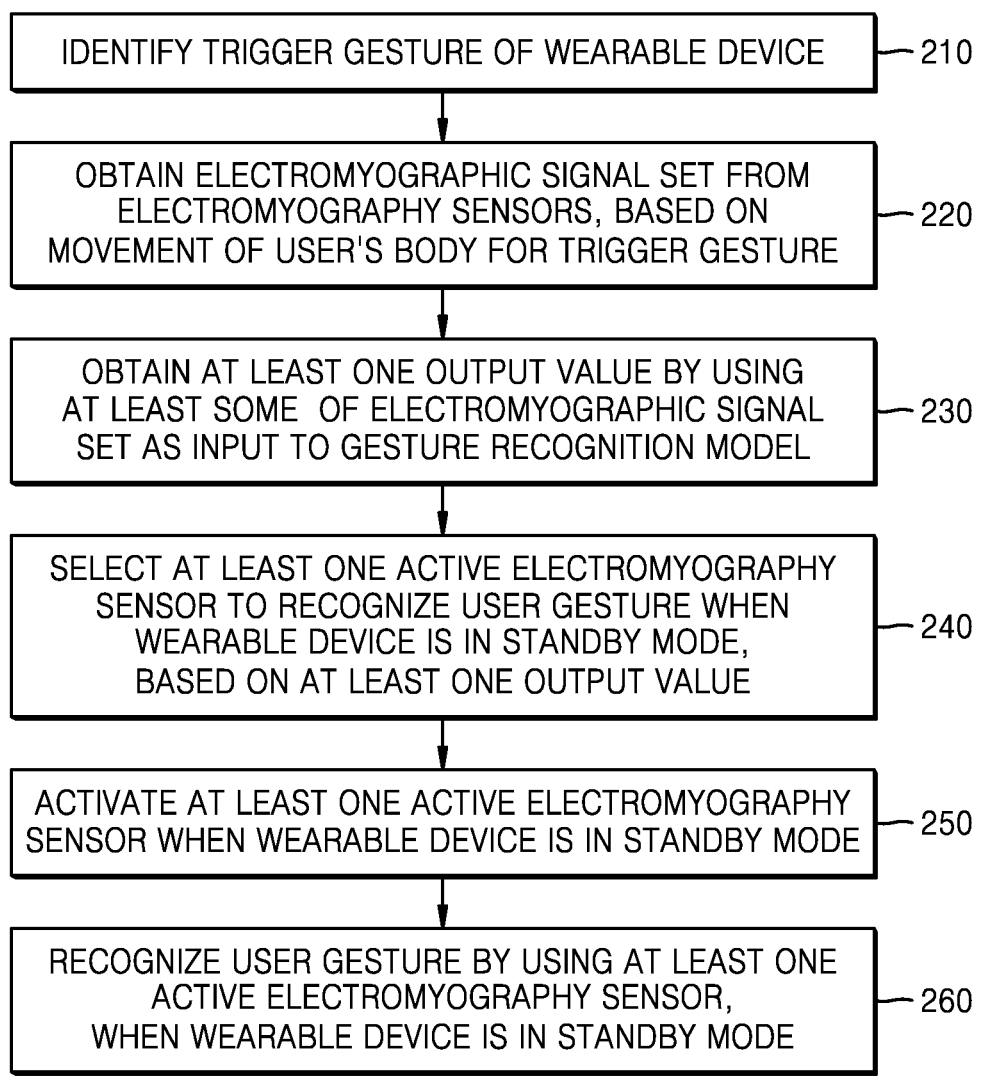
FIG. 2 is a flowchart of an exemplary method of recognizing a gesture by using a wearable device, according to an embodiment of the disclosure.

FIG. 2 is a flowchart of a method of recognizing a gesture by using the wearable device 110, according to an embodiment of the disclosure.

Referring to FIG. 2, the wearable device 110 may select active EMG sensors that are to be activated when the wearable device 110 is in a standby mode, from among the EMG sensors 120, in operations 210 to 240, and recognize a user gesture by using the active EMG sensors, when the wearable device 110 is in a standby mode, in operations 250 and 260.

In operation 210, the wearable device 110 may identify the trigger gesture 140. According to an embodiment of the disclosure, the trigger gesture 140 may be selected from among a plurality of trigger gestures based on a user input to the wearable device 110, or receive an identification value of the trigger gesture 140 from an external device connected to the wearable device 110. For convenience of explanation, for example, in FIG. 2, the trigger gesture 140 may be "scissors," but the disclosure is not limited thereto.

In operation 220, the wearable device 110 may obtain the EMG signal set 130 from the EMG sensors 120, based on a movement of a user's body for the trigger gesture 140. According to an embodiment of the disclosure, the EMG signal set 130 may include a plurality of EMG signals obtained from a plurality of EMG sensors. According to an embodiment of the disclosure, a user may perform a hand gesture corresponding to the trigger gesture 140. For example, a user may perform a hand gesture corresponding to "scissors." According to an embodiment of the disclosure, the wearable device 110 may obtain the EMG signal set 130 corresponding to the user's hand gesture, from the EMG sensors 120, based on the user's hand gesture. For example, the EMG signal set 130 may include EMG signals obtained by using all of the EMG sensors 120 of the wearable device 110. According to an embodiment of the disclosure, a user may repeat a hand gesture corresponding to the trigger gesture 140 multiple times. For example, a user may repeat a "scissors" hand gesture. The wearable device 110 may obtain a plurality of EMG sensor sets 130 corresponding to the user's multiple hand gestures. For example, one EMG signal set 130 may include EMG signals obtained while a user performs a hand gesture once, but the disclosure is not limited thereto.

In operation 230, the wearable device 110 may obtain at least one output value by using at least some of the EMG signal set 130 as an input to a gesture recognition model. According to an embodiment of the disclosure, an input signal set, as an input to a gesture recognition model, may include a set of EMG signals including some EMG signals of the EMG signal set 130 that are obtained through the EMG sensors 120 of the wearable device 110. For example, the wearable device 110 may obtain the EMG signal set 130 through eight EMG sensors, and the input signal set may include the second, fourth, and fifth EMG signals among the signals of the EMG signal set 130. According to an embodiment of the disclosure, the input signal set may further include a signal obtained when an EMG sensor is not activated, according to the format of data input to a gesture recognition model. For example, when the format of data input to a gesture recognition model data includes eight EMG signals, the input signal set may include the second, fourth, and fifth EMG signals of the EMG signal set 130 as the second, fourth, and fifth EMG signals of the input signal set, and a signal, for example, a signal in which a value is maintained to be 0, and the like, obtained when the EMG sensor is not activated, as the first, third, and sixth to eighth EMG signals of the input signal set. According to an embodiment of the disclosure, the input signal set may include signals obtained by preprocessing a plurality of EMG signals obtained through a plurality of EMG sensors. For example, the input signal set may include signals obtained by Fourier-transforming the EMG signals of the EMG signal set 130, but the disclosure is not limited thereto.

According to an embodiment of the disclosure, the wearable device 110 may obtain a plurality of output values by using a plurality of input signal sets as an input to a gesture recognition model. For example, a first input signal set may include EMG signals obtained through the first, third, and fourth EMG sensors 120, and a second input signal set may include EMG signals obtained through the second, fifth, and sixth EMG sensors 120.

According to an embodiment of the disclosure, a gesture recognition model may be an artificial intelligence model trained to receive an EMG signal as an input, and output information about a gesture. According to an embodiment of the disclosure, the output value of a gesture recognition model may include prediction probability for each gesture.

In operation 240, the wearable device 110 may select at least one active EMG sensor to recognize a user gesture when the wearable device 110 is in a standby mode, based on the at least one output value of a gesture recognition model. The wearable device 110 may, for example, identify an input signal set corresponding to a high prediction probability with respect to a trigger gesture output from the gesture recognition model, from the input signal sets input to the gesture recognition model, and select at least one EMG sensor corresponding to the identified input signal set as an active EMG sensor.

In operation 250, the wearable device 110 may activate the at least one active EMG sensor when the wearable device 110 is in a standby mode. According to an embodiment of the disclosure, the wearable device 110 may measure a user's EMG signal periodically, for example, 1 second, 0.5 seconds, and the like, through the at least one active EMG sensor that is activated, in a standby mode. When the wearable device 110 is in a standby mode, only some of a plurality of EMG sensors are activated, thereby reducing power consumption.

In operation 260, when the wearable device 110 is in a standby mode, the wearable device 110 may recognize a user gesture by using the at least one active EMG sensor. According to an embodiment of the disclosure, the wearable device 110 may recognize a user gesture by periodically obtaining a user's EMG signal by using an active EMG sensor. For example, the EMG signal set 130 that is obtained when the wearable device 110 is in a standby mode may include EMG signals obtained through the active EMG sensors. According to an embodiment of the disclosure, when the wearable device 110 is in a standby mode, an input signal set may be the EMG signal set 130 that is obtained through the active EMG sensors. For example, the wearable device 110 may identify a user gesture based on an output obtained by using the EMG signal set 130 that is obtained through active EMG sensors, as an input to a gesture recognition model.

According to an embodiment of the disclosure, the wearable device 110 may activate some of the EMG sensors 120, based on the recognized user gesture being the same as the trigger gesture. According to an embodiment of the disclosure, the wearable device 110 may additionally activate all of the EMG sensors that are not activated among the EMG sensors 120. For example, as the wearable device 110 additionally activates all of the EMG sensors that are not activated, the wearable device 110 may obtain the EMG signal set 130 including eight EMG signals measured through all of the eight EMG sensors 120.

Figure 3:
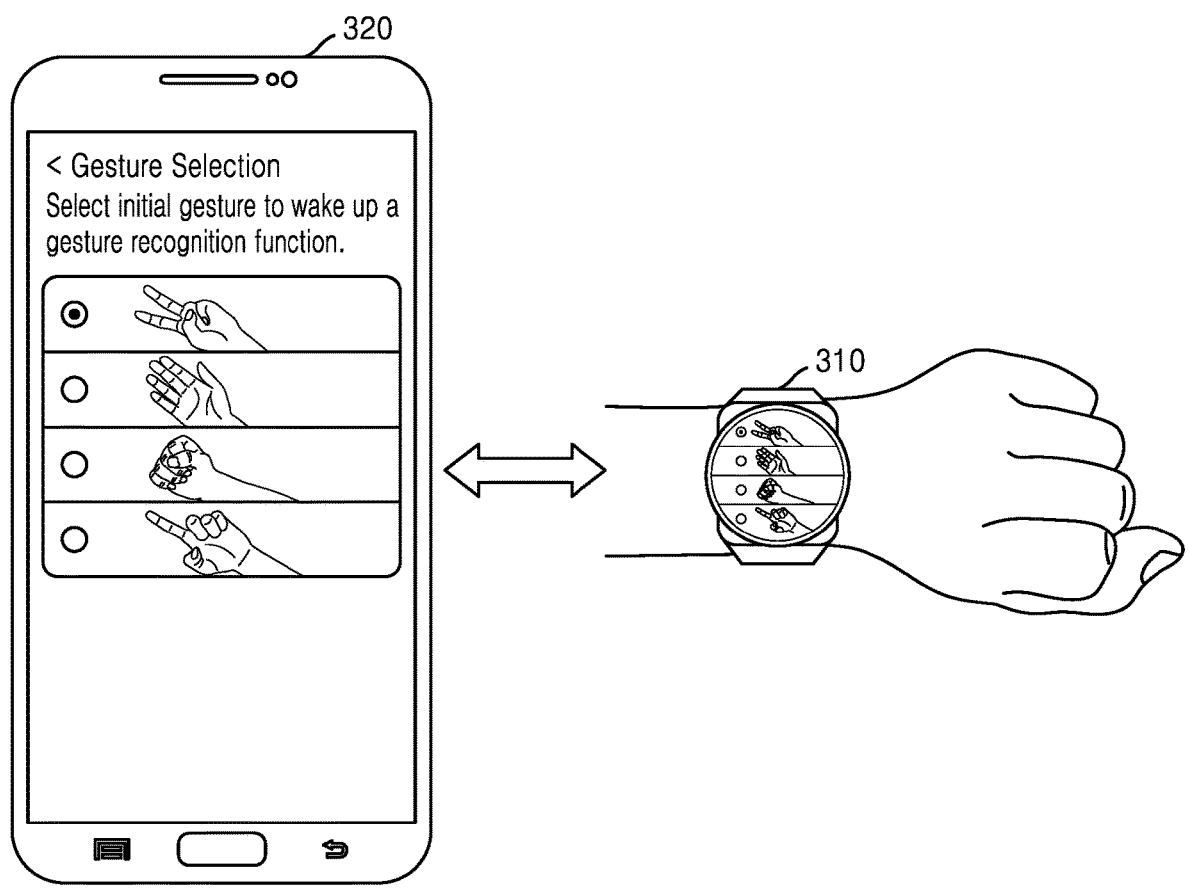
FIG. 3 illustrates an example of identifying a trigger gesture, according to an embodiment of the disclosure.

FIG. 3 illustrates an example of identifying a trigger gesture, according to an embodiment of the disclosure.

According to an embodiment of the disclosure, a trigger gesture may be identified by a wearable device 310, based on information obtained from the wearable device 310 or information received from an external electronic apparatus 320 communicating with the wearable device 310. According to an embodiment of the disclosure, a user may select a trigger gesture through the wearable device 310. According to an embodiment of the disclosure, the wearable device 310 may display a gesture list including a plurality of gestures to be selected as a trigger gesture, on a display of the wearable device 310. The wearable device 310 may obtain a user's input to select a trigger gesture from the displayed gesture list. The wearable device 310 may identify a gesture selected by a user from the gesture list, as a trigger gesture. According to an embodiment of the disclosure, the trigger gesture may be a custom gesture that is arbitrarily set by a user. For example, to select a trigger gesture, the gesture list may include an option of a custom gesture.

According to an embodiment of the disclosure, a trigger gesture of the wearable device 310 may be selected in advance and stored in a memory of the wearable device 310. The wearable device 310 may identify a trigger gesture through information stored in the memory.

According to an embodiment of the disclosure, the wearable device 310 may be connected to the external electronic apparatus 320. According to an embodiment of the disclosure, the external electronic apparatus 320 may display a gesture list including a plurality of gestures to be selected as a trigger gesture. According to an embodiment of the disclosure, the external electronic apparatus 320 may display a gesture list including custom gestures that are arbitrarily set by a user. According to an embodiment of the disclosure, as a user selects a trigger gesture through the external electronic apparatus 320, the external electronic apparatus 320 may transmit information about the selected trigger gesture to the wearable device 310. The wearable device 310 may identify a trigger gesture through the information received from the external electronic apparatus 320.

According to an embodiment of the disclosure, the trigger gesture may be stored in a memory of the external electronic apparatus 320. According to an embodiment of the disclosure, the wearable device 310 may identify the trigger gesture by receiving information about a trigger gesture from the external electronic apparatus 320.

According to an embodiment of the disclosure, the trigger gesture may include a default gesture. According to an embodiment of the disclosure, the default gesture may include a gesture preset in the wearable device 310. For example, the wearable device 310 may be preset "scissors" as a trigger gesture. According to an embodiment of the disclosure, even when the default gesture of the wearable device 310 is set, the trigger gesture may be changed by user's trigger gesture selection.

Figure 4:
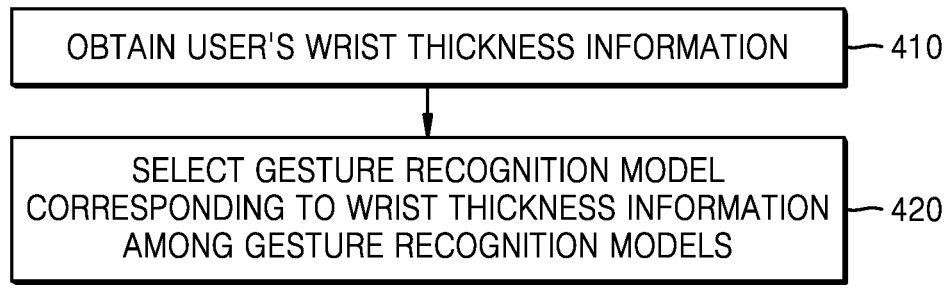
FIG. 4 is a flowchart of an exemplary method of recognizing a gesture by using a wearable device, according to an embodiment of the disclosure.

FIG. 4 is a flowchart of a method of recognizing a gesture by using the wearable device 110, according to an embodiment of the disclosure.

In operation 410, the wearable device 110 may obtain user's wrist thickness information. According to an embodiment of the disclosure, the wearable device 110 may obtain user's wrist thickness by measuring a user's wrist thickness, or through a user's input. According to an embodiment of the disclosure, the wearable device 110 may receive user's wrist thickness information from the external electronic apparatus 320. According to an embodiment of the disclosure, the user's wrist thickness information may be stored in the memory of the wearable device 110.

In operation 420, the wearable device 110 may select a gesture recognition model corresponding to wrist thickness information obtained from a plurality of gesture recognition models. According to an embodiment of the disclosure, the wearable device 110 may include a gesture recognition model for each wrist thickness. For example, the wearable device 110 may include gesture recognition models having wrist thicknesses corresponding to 14 cm, 15 cm, . . . , and 18 cm, but the disclosure is not limited thereto. For example, a gesture recognition model corresponding to the user's wrist thickness may recognize a user gesture better than other gesture recognition models. According to an embodiment of the disclosure, a gesture recognition model for each wrist thickness may include an artificial intelligence model trained based on user's EMG signals corresponding to the wrist thickness. For example, a 14 cm gesture recognition model may be trained based on the EMG signals of a user having a wrist thickness of 14.3 cm and a user having a wrist thickness of 14.8 cm, and a 15 cm gesture recognition model may be trained based on the EMG sensors of a user having a wrist thickness of 15.1 cm and a user having a wrist thickness of 15.6 cm, but the disclosure is not limited thereto.

According to an embodiment of the disclosure, in operation 230, the wearable device 110 may select a gesture recognition model corresponding to the user's wrist thickness from among a plurality of gesture recognition models, and input an input signal set to the selected gesture recognition model corresponding to the wrist thickness.

Figure 5:
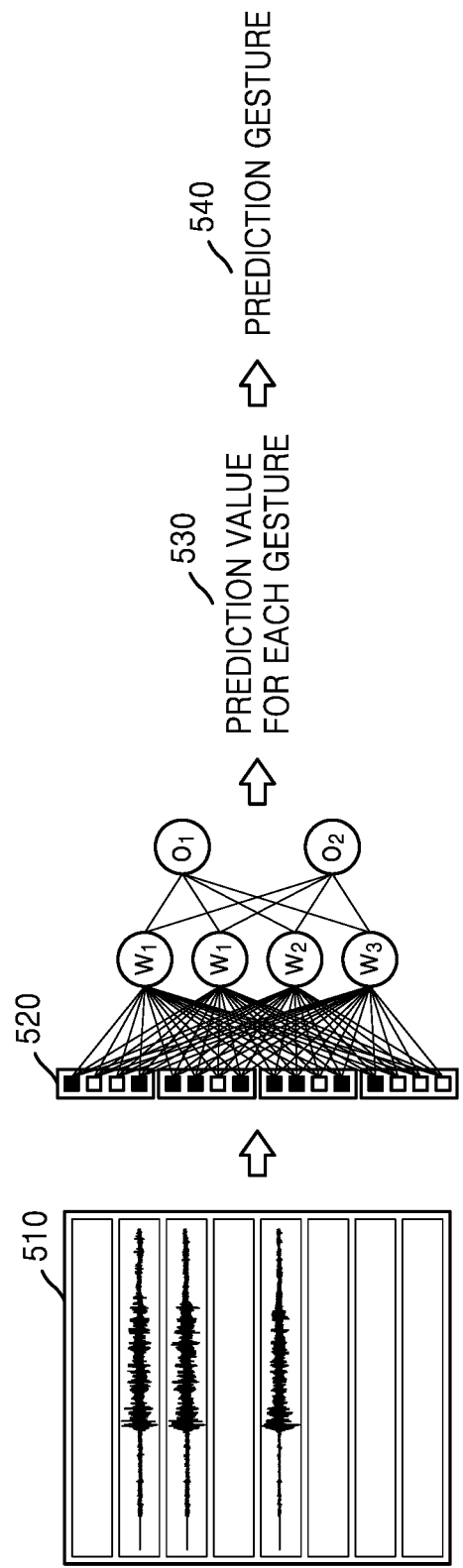
FIG. 5 illustrates an example of a gesture recognition model according to an embodiment of the disclosure.

FIG. 5 illustrates an example of a gesture recognition model 520 according to an embodiment of the disclosure.

According to an embodiment of the disclosure, the gesture recognition model 520 may have an input signal set 510 as an input and a prediction value 530 for each gesture as an output value. According to an embodiment of the disclosure, the gesture recognition model 520 may include an artificial intelligence model. The artificial intelligence model may include, for example, a model based on artificial neural network. The artificial neural network may include a deep neural network (DNN), for example, a convolutional neural network (CNN), a deep neural network (DNN), a recurrent neural network (RNN), a restricted Boltzmann machine (RBM), a deep belief network (DBN), a bidirectional recurrent DNN (BRDNN), a deep Q-network, or the like, but the disclosure is not limited thereto.

According to an embodiment of the disclosure, the gesture recognition model 520 may be trained through EMG signal data obtained corresponding to a user's specific gesture. According to an embodiment of the disclosure, the gesture recognition model 520 may be trained for each user's wrist thickness information. For example, the gesture recognition model 520 may include user gesture recognition models having wrist thicknesses of 14 cm, 15 cm, . . . , 18 cm, but the disclosure is not limited thereto. According to an embodiment of the disclosure, the gesture recognition model 520 may be trained with data obtained by preprocessing the obtained EMG signal data. According to an embodiment of the disclosure, the gesture recognition model 520 may be trained through fragmented EMG signals. For example, the gesture recognition model 520 that is trained through short fragmented EMG signals may make the obtained EMG signals into short fragments and use the short-fragmented signals as an input, which may be effective in recognizing a gesture in real time.

According to an embodiment of the disclosure, the input signal set 510, as an input to a gesture recognition model, may include a set of EMG signals obtained through all or some of EMG sensors of the wearable device 110. According to an embodiment of the disclosure, the wearable device 110 may select the input signal set 510 to include some EMG signals in the EMG signal set 130. According to an embodiment of the disclosure, the input signal set 510 may include a set of EMG signals that have not passed a separate preprocessing process, or a set of EMG sensors that have passed a separate preprocessing process. According to an embodiment of the disclosure, the input signal set 510 may include EMG signals fragmented shorter than a user gesture performance time. For example, when the user gesture performance time is one second, the input signal set 510 may include one hundred of fragmented EMG signals at a period of 10 ms, but the disclosure is not limited thereto.

According to an embodiment of the disclosure, the prediction value 530 for each gesture may include prediction probability for each gesture. According to an embodiment of the disclosure, the prediction probability for each gesture may be a probability that a user gesture is predicted to be a corresponding gesture. For example, the prediction value 530 for each gesture may include a prediction probability for "scissors" of 0.345, a prediction probability for "rock" of 0.545, a prediction probability for "paper" of 0.110, but the disclosure is not limited thereto.

According to an embodiment of the disclosure, the wearable device 110 may select a prediction gesture 540 based on the prediction value 530 for each gesture. According to an embodiment of the disclosure, the prediction gesture 540 may be a gesture corresponding to the largest prediction value of the prediction value 530 for each gesture corresponding to one input signal set. For example, a "rock" may be selected as the prediction gesture 540 based on the prediction probability for "rock" being greater than the prediction probabilities for "scissors" and "paper."

Figure 6:
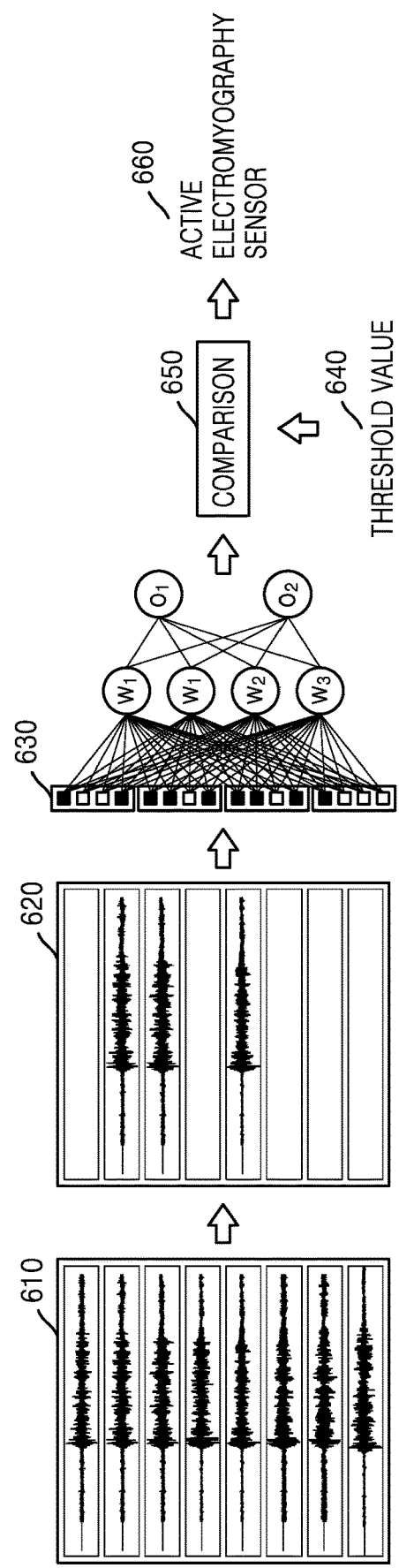
FIG. 6 illustrates an example of selecting an active electromyography sensor, according to an embodiment of the disclosure.

FIG. 6 illustrates an example of selecting an active EMG sensor 660, according to an embodiment of the disclosure.

Referring to FIG. 6, for example, the active EMG sensor 660 may be selected based on one input signal set 620. As described in FIG. 5, the wearable device 110 may obtain the input signal set 620 from an EMG signal set 610 obtained through a plurality of EMG sensors. For example, the input signal set 620 may include the second, third, and fifth EMG signals of the EMG signal set 610.

The wearable device 110 may obtain an output value by inputting the input signal set 620 to a gesture recognition model 630. According to an embodiment of the disclosure, the wearable device 110 may select the active EMG sensor 660 by comparing the output value with a threshold value 640 in a comparison operation 650. For example, the output value of the gesture recognition model 630 may be a prediction probability, and the prediction probability of "rock" that is a trigger gesture may be 0.545. According to an embodiment of the disclosure, when the prediction probability of a trigger gesture is the threshold value 640 or more, EMG sensors corresponding to an input signal set may be selected as the active EMG sensor 660. For example, when the threshold value is 0.5, the wearable device 110 may select the second, third, and fifth EMG sensors of the wearable device 110 as active EMG sensors. According to an embodiment of the disclosure, when the prediction probability of a trigger gesture is less than the threshold value, the input signal set 620 may be selected again. By using the input signal set 620 that is selected again as an input to the gesture recognition model 630, the output value of the gesture recognition model 630 may be compared with the threshold value 640 in the comparison operation 650. For example, although a first input signal set includes the second, third, and fifth EMG signals, when a result of the comparison operation 650 is less than the threshold value 640, by including the first, fourth, and sixth EMG sensors as a second input signal set, the comparison operation 650 may be repeated.

Figure 7:
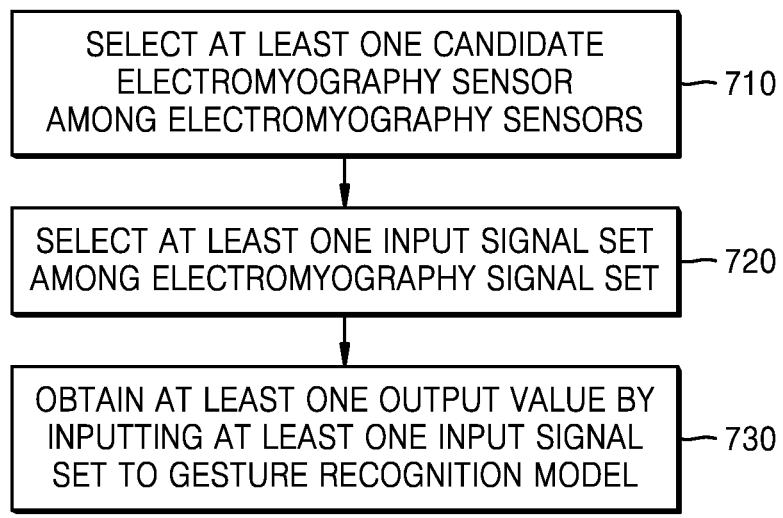
FIG. 7 is a flowchart of an exemplary method of recognizing a gesture by using a wearable device, according to an embodiment of the disclosure.

FIG. 7 is a flowchart of a method of recognizing a gesture by using the wearable device 110, according to an embodiment of the disclosure.

Referring to FIG. 7, the wearable device 110 may select at least one input signal set from the EMG signal set 130. In operation 710, the wearable device 110 may select at least one candidate EMG sensor set from among the EMG sensors 120. According to an embodiment of the disclosure, the wearable device 110 may select each of sets of all combinations including at least one of the EMG sensors 120, as a candidate EMG sensor set. According to an embodiment of the disclosure, the wearable device 110 may select all combinations of a specific number or more or a specific number of less, as a candidate EMG sensor set. For example, the wearable device 110 may select each of sets of combinations include five or less EMG sensors, as a candidate EMG sensor set. According to an embodiment of the disclosure, the wearable device 110 may select a combination of predetermined priority EMG sensors, as a candidate EMG sensor set. For example, when a trigger gesture is a "scissors" gesture, the wearable device 110 may preferentially consider a first combination including the first, second, and third EMG sensors that are combinations of priority EMG sensors predetermined with respect to the "scissors" and a second combination including the second to fifth EMG sensors. According to an embodiment of the disclosure, the wearable device 110 may select an active EMG sensor by comparing predetermined priority combinations. According to an embodiment of the disclosure, priority EMG sensor combinations for each trigger gesture may be stored in the memory of the wearable device 110, or received from the external electronic apparatus 320. According to an embodiment of the disclosure, priority EMG sensor combinations for each trigger gesture may be predetermined based on human anatomy information or EMG signal information for each gesture. The wearable device 110 may select priority combination based on anatomy information or candidate sensor statistics information.

In operation 720, the wearable device 110 may select at least one input signal set among the EMG signal set 130. According to an embodiment of the disclosure, each input signal set may include EMG signals obtained through the EMG sensors included in the candidate EMG sensor set selected in operation 710, among the EMG signal set 130. For example, when a first candidate EMG sensor set includes the first, third, and fifth EMG sensors, a first input signal set may include the first, third, and fifth EMG signals among the EMG signal set 130. In operation 730, at least one output value may be obtained by using each of the selected input signal sets as an input to a gesture recognition model.

Figure 8:
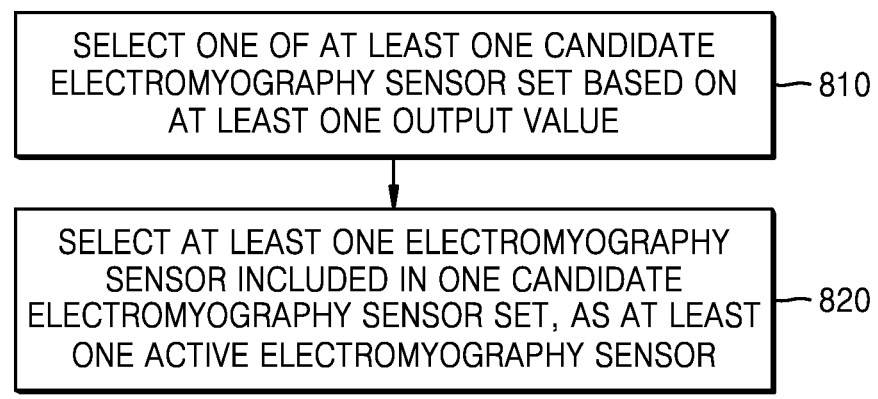
FIG. 8 is a flowchart of an exemplary method of recognizing a gesture by using a wearable device, according to an embodiment of the disclosure.

FIG. 8 is a flowchart of a method of recognizing a gesture by using the wearable device 110, according to an embodiment of the disclosure.

Referring to FIG. 8, the wearable device 110 may select an active EMG sensor based on the output value of a gesture recognition model. In operation 810, the wearable device 110 may select one of at least one candidate EMG sensor set based on the at least one output value of a gesture recognition model. The wearable device 110 may obtain the at least one output value of a gesture recognition model corresponding to each input signal set. According to an embodiment of the disclosure, the wearable device 110 may identify an input signal set having the largest output value with respect to a trigger gesture, by comparing the output values for the trigger gesture among the output values of each input signal set with each other. According to an embodiment of the disclosure, the wearable device 110 may select one of at least one candidate EMG sensor set from a candidate EMG sensor set corresponding to the identified input signal set. According to an embodiment of the disclosure, the wearable device 110 may select a new candidate EMG sensor combination when the largest value of the output values with respect to a trigger gesture is less than a threshold value.

In operation 820, the wearable device 110 may select at least one of EMG sensors included in the selected one candidate EMG sensor set, as at least one active EMG sensor.

Figure 9A:
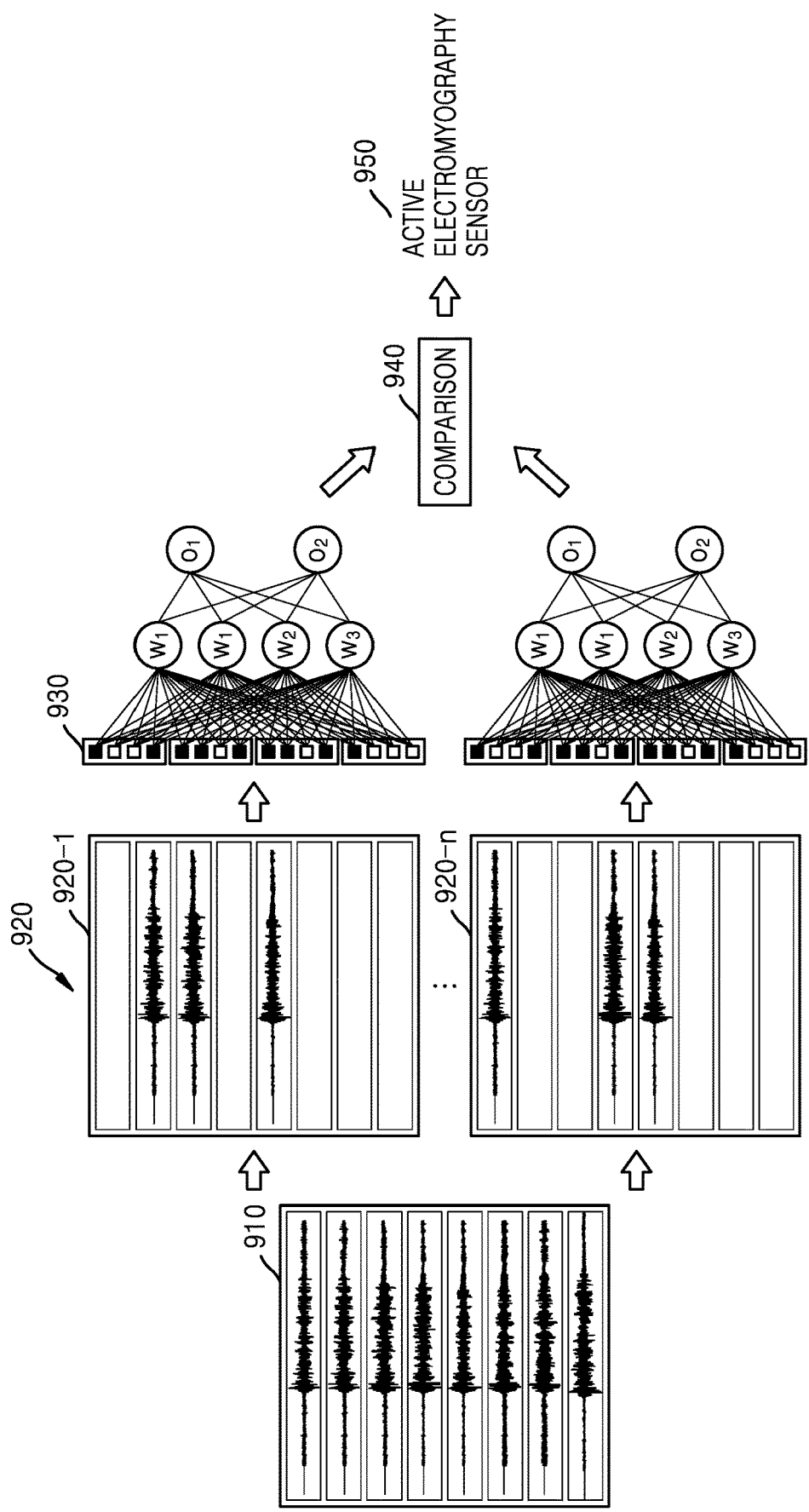
FIG. 9A illustrates an example of selecting an active electromyography sensor, according to an embodiment of the disclosure.
Figure 9B:
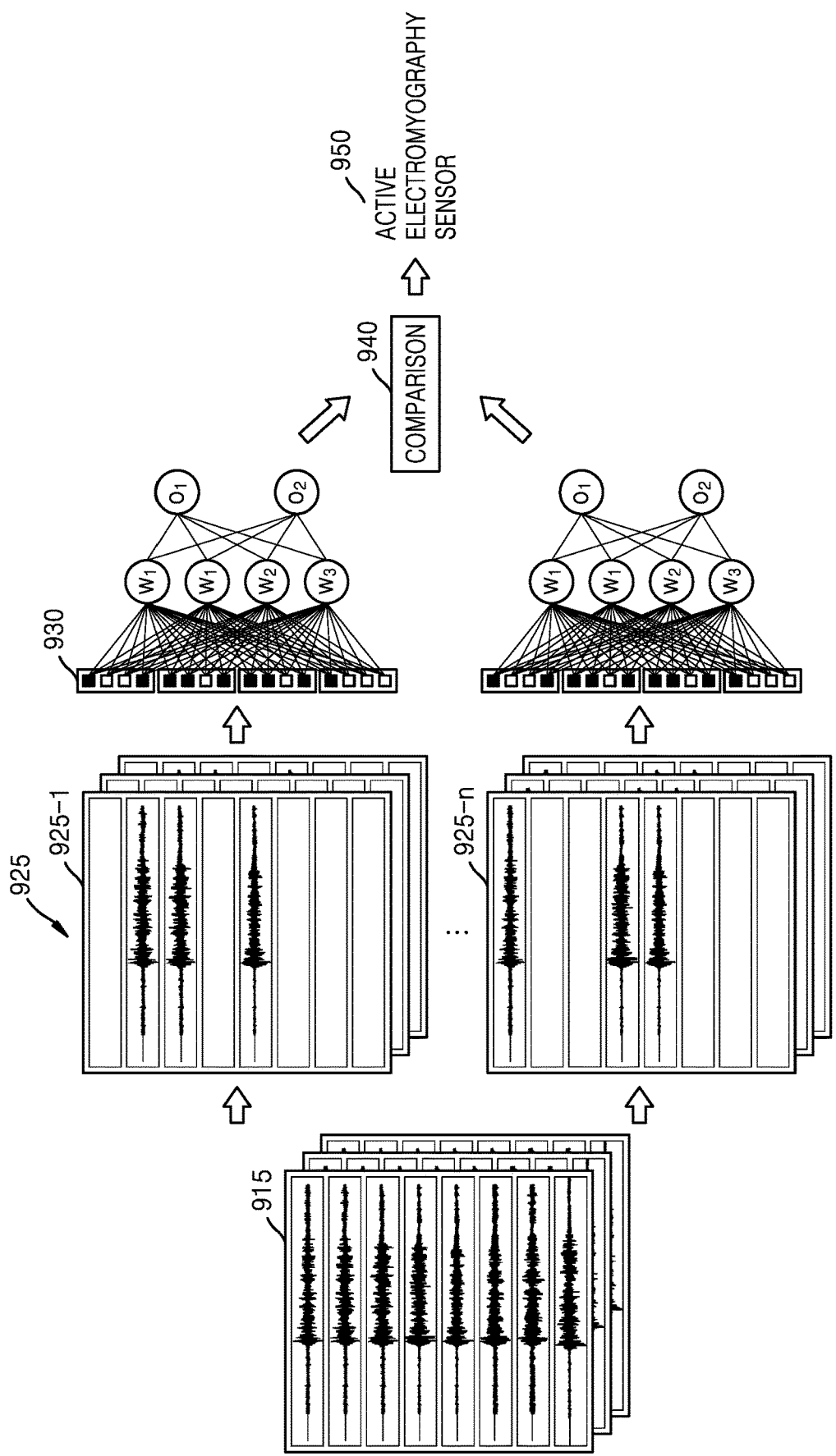
FIG. 9B illustrates an example of selecting an active electromyography sensor, according to an embodiment of the disclosure.

FIGS. 9A and 9B illustrate examples of selecting an active EMG sensor 950, according to embodiments of the disclosure.

Referring to FIG. 9A, the active EMG sensor 950 may be selected based on an EMG signal set 910. Referring to FIG. 9B, the active EMG sensor 950 may be selected based on a plurality of EMG signal sets 915. The wearable device 110 may obtain a plurality of EMG signal sets 910 through the EMG sensors 120. According to an embodiment of the disclosure, the wearable device 110 may select a plurality of candidate EMG sensor sets. For example, a first input signal set 920-1 may include EMG signals obtained by EMG sensors included in a first candidate EMG sensor set, and an n-th input signal set 920-$n$ may include EMG signals obtained by EMG sensors included in the n-th candidate EMG sensor set. For example, the wearable device 110 may obtain at least one n-th output value by using the n-th input signal set 920-$n$ as an input to a gesture recognition model 930. According to an embodiment of the disclosure, the n-th output value may include a prediction probability for each gesture.

The wearable device 110 may select the active EMG sensor 950 by comparing output values corresponding to a trigger gesture among a plurality of output values in a comparison operation 940. According to an embodiment of the disclosure, the wearable device 110 may identify each output value corresponding to a trigger gesture among the first output value to the n-th output value, and compare output values corresponding to the trigger gesture in the comparison operation 940. For example, when a first output value corresponding to a trigger gesture is 0.545 and a second output value corresponding to the trigger gesture is 0.497, the wearable device 110 may identify a first output value as a relatively great output value. According to an embodiment of the disclosure, the wearable device 110 may select a candidate EMG sensor set corresponding to the identified output value as a result of the comparison operation 940, as the active EMG sensor 950. For example, EMG sensors included in first candidate EMG sensor set corresponding to the identified first output value may be selected as an active EMG sensor.

Referring to FIG. 9B, the active EMG sensor 950 may be selected based on the EMG signal sets 915.

According to an embodiment of the disclosure, as user repeat gesture corresponding to a trigger gesture multiple times, the wearable device 110 may obtain a plurality of EMG signal sets 915 through a plurality of EMG sensors. For example, the EMG signal sets 915 may include EMG signals obtained through the activated EMG sensors 120 of the wearable device 110. According to an embodiment of the disclosure, the wearable device 110 may select a plurality of candidate EMG sensor sets.

According to an embodiment of the disclosure, the wearable device 110 may obtain a plurality of input signal sets 925 from each of the EMG signal sets 915. For example, a first input signal sets 925-1 may include EMG signals obtained by a first candidate EMG sensor set among the EMG signal sets 915, and n-th input signal sets 925-$n$ may include EMG signals obtained by the n-th candidate EMG sensor set among the EMG signal sets 915. According to an embodiment of the disclosure, the wearable device 110 may use each of the input signal sets 925 as an input to the gesture recognition model 930. For example, the wearable device 110 may obtain the n-th output value by using the n-th input signal set 925-$n$ as an input to the gesture recognition model 930, and the n-th output value may include a prediction probability for each gesture.

The wearable device 110 may select the active EMG sensor 950 by comparing output values corresponding to a trigger gesture among a plurality of output values in a comparison operation 940. According to an embodiment of the disclosure, the wearable device 110 may select a prediction gesture based on a prediction value for each gesture. According to an embodiment of the disclosure, the prediction gesture may be a gesture having the greatest prediction value for each gesture. For example, "rock" may be selected as a prediction gesture based on a prediction probability for "rock" being the greatest. According to an embodiment of the disclosure, the wearable device 110 may obtain, as reliability, a ratio of a prediction gesture and a trigger gesture being the same. For example, when a case of a prediction gesture and a trigger gesture being the same occurs 36 times, and a case of a selected prediction gesture being different form a trigger gesture occurs four times, reliability may be 90%. According to an embodiment of the disclosure, the wearable device 110 may select a candidate EMG sensor set with the greatest reliability, as an active EMG sensor.

Figure 10:
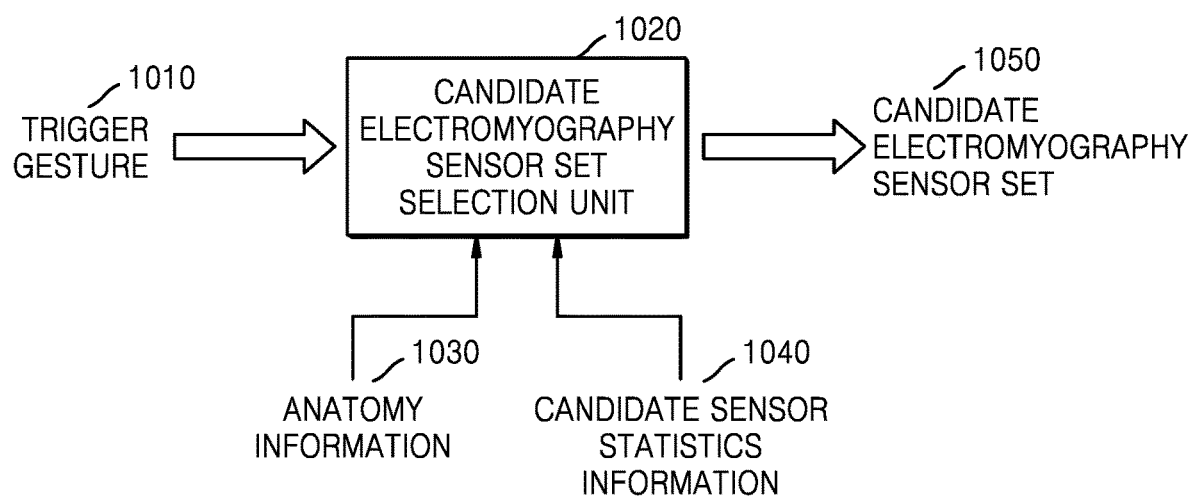
FIG. 10 is a block diagram showing an example process of selecting a candidate electromyography sensor set, according to an embodiment of the disclosure.

FIG. 10 is a block diagram showing an example of selecting a candidate EMG sensor set, according to an embodiment of the disclosure.

The wearable device 110 may include a candidate EMG sensor set selection unit 1020. According to an embodiment of the disclosure, the candidate EMG sensor set selection unit 1020 may obtain a candidate EMG sensor set 1050 based on a trigger gesture 1010 and at least one of anatomy information 1030 or candidate sensor statistics information 1040.

According to an embodiment of the disclosure, the anatomy information 1030 may include information about human muscles, tendons, and the like, as anatomy information about the human body. The human body includes bones, muscles, tendons, and the like. In most cases, the bones, muscles, or tendons of a human are anatomically located at similar positions. Furthermore, there are muscles or tendons used for a specific gesture of a human. Accordingly, the muscles or tendons used for a specific gesture may be inferred. According to an embodiment of the disclosure, the wearable device 110 may select a candidate EMG sensor set based on the anatomy information 1030. For example, when performing an operation with respect to a trigger gesture, the wearable device 110 may identify the positions of muscles or tendons of a human body, and select EMG sensors located at the identified positons as a candidate EMG sensor set. According to an embodiment of the disclosure, when selecting a preferentially EMG sensor set based on the anatomy information 1030, the wearable device 110 may select, without verifying all EMG sensor combinations, EMG sensor combinations that are effective to trigger gesture recognition.

The candidate sensor statistics information 1040 may include statistics information about a priority combination of EMG sensors having reliability of a certain level or more corresponding to a specific gesture. According to an embodiment of the disclosure, the candidate sensor statistics information 1040 may include statistics information about EMG sensor combinations according to the number of sensors. The candidate sensor statistics information 1040 may include a candidate sensor combination for each number of sensors, for example, in Table 1, and further include reliability about a candidate sensor combination, but the disclosure is not limited thereto. According to an embodiment of the disclosure, the reliability may mean the average of the output values of a gesture recognition model. According to an embodiment of the disclosure, the reliability may mean a ratio that a prediction gesture is the same as a trigger gesture. For example, a gesture corresponding to the greatest value among the output values of a gesture recognition model may be selected as the prediction gesture. When a case of the selected prediction gesture being the same as the trigger gesture occurs 38 times, and a case of the selected prediction gesture being different from the trigger gesture occurs twice, the reliability may be 95%, but the disclosure is not limited thereto.

TABLE 1

| The Number of Sensors | EMG Sensor Combination | Reliability |
|---|---|---|
| 4 | 2, 4, 5, 7 | 92.92% |
| 5 | 0, 2, 3, 6, 7 | 96.77% |
| 6 | 0, 1, 2, 5, 6, 7 | 97.60% |
| 7 | 1, 2, 3, 4, 5, 6, 7 | 98.23% |
| 8 | 0, 1, 2, 3, 4, 5, 6, 7 | 97.50% |

Referring to Table 1, for example, among combinations of four EMG sensors, a combination including the second, fourth, fifth, and seventh EMG sensors may have the greatest reliability with respect to the trigger gesture. For example, the reliability may mean a prediction probability with respect to the trigger gesture.

Referring to Table 1, for example, there are EMG sensors (the second and seventh EMG sensors) that are continuously included regardless of the number of sensors, whereas there are sensors that are determined to be included or not included in a channel combination depending on the number of sensors. The candidate sensor statistics information 1040 may include a plurality of EMG sensor combinations for each number of sensors. For example, EMG sensors included in an EMG sensor combination may be changed according to the number of EMG sensors. According to an embodiment of the disclosure, the wearable device 110 may select an EMG sensor combination included in the candidate sensor statistics information 1040, as a candidate EMG sensor set.

According to an embodiment of the disclosure, the candidate sensor statistics information 1040 may include statistics information for each user's wrist thickness. For example, the candidate sensor statistics information 1040 may include, as shown in Table 2, importance for each of six sensors with respect to 14 cm to 18 cm wrist thicknesses, but the disclosure is not limited thereto. For example, it may be understood that the first sensor, the second sensor, and the like of Table 2 may correspond to the first sensor, the second sensor, and the like of the wearable device 110, but the disclosure is not limited thereto.

TABLE 2

|  | 18 cm | 17 cm | 16 cm | 15 cm | 14 cm |
|---|---|---|---|---|---|
| The $1^{st}$ sensor | 0.225 | 0.1667 | 0.0625 | 0.27 | 0.05 |
| The $2^{nd}$ sensor | 0.1375 | 0.2 | 0.2125 | 0.19 | 0.2 |
| The $3^{rd}$ sensor | 0.175 | 0.1833 | 0.275 | 0.25 | 0.25 |
| The $4^{th}$ sensor | 0.15 | 0.35 | 0.3125 | 0.27 | 0.25 |
| The $5^{th}$ sensor | 0.1375 | 0.1 | 0.0375 | 0.02 | 0 |
| The $6^{th}$ sensor | 0.175 | 0.15 | 0.1 | 0 | 0.25 |

In Table 2, for example, when the wrist thickness is 14 cm, the importance of the $3^{rd}$ sensor, the $4^{th}$ sensor, and the $6^{th}$ sensor may be 0.25 that is the greatest. For example, the importance of each sensor may mean a probability included in a priority combination having reliability corresponding to a certain value or more.

In Table 2, for example, a sensor having high importance may differ for each wrist thickness. The candidate sensor statistics information 1040 may include statistics information for each user's wrist thickness, and use the candidate sensor statistics information 1040 corresponding to user's wrist thickness information.

The wearable device 110 may select a candidate EMG sensor set from among the EMG sensors 120, and select an input signal set obtained through EMG sensors of a candidate EMG sensor set of the EMG signal set 130. When selecting a candidate EMG sensor set from among the EMG sensors 120, the wearable device 110 may select the candidate EMG sensor set based on the trigger gesture 1010 and at least one of the anatomy information 1030 or the candidate sensor statistics information 1040. According to an embodiment of the disclosure, the wearable device 110 may include the candidate sensor statistics information 1040 corresponding to each of a plurality of gestures.

According to an embodiment of the disclosure, the candidate EMG sensor set selection unit 1020 may select a candidate EMG sensor set based on the trigger gesture 1010 and the anatomy information 1030. According to an embodiment of the disclosure, the candidate EMG sensor set selection unit 1020 may identify the anatomy information 1030 corresponding to the trigger gesture 1010. According to an embodiment of the disclosure, the candidate EMG sensor set selection unit 1020 may identify muscles or tendons used when the trigger gesture 1010 is performed, based on the anatomy information 1030, and select EMG sensors located at the positions of muscles or tendons that are used, as a candidate EMG sensor set.

According to an embodiment of the disclosure, the candidate EMG sensor set selection unit 1020 may select a candidate EMG sensor set based on the trigger gesture 1010 and the candidate sensor statistics information 1040. According to an embodiment of the disclosure, the candidate EMG sensor set selection unit 1020 may identify the candidate sensor statistics information 1040 corresponding to the trigger gesture 1010. According to an embodiment of the disclosure, the candidate EMG sensor set selection unit 1020 may select a sensor combination about a specific number of EMG sensors, as a candidate EMG sensor set. For example, the candidate EMG sensor set selection unit 1020 may include only a sensor combination in which the number of sensors is five or less, but the disclosure is not limited thereto. According to an embodiment of the disclosure, the candidate EMG sensor set selection unit 1020 may select EMG sensor combinations having a certain reliability or more, as a candidate EMG sensor set. For example, the candidate EMG sensor set selection unit 1020 may include only sensor combinations having a reliability of 95% or more, but the disclosure is not limited thereto.

According to an embodiment of the disclosure, the candidate EMG sensor set selection unit 1020 may select a candidate EMG sensor set based on the trigger gesture 1010, the anatomy information 1030, and the candidate sensor statistics information 1040. According to an embodiment of the disclosure, the wearable device 110 may an EMG sensor combination included in both of the anatomy information 1030 and the candidate sensor statistics information 1040, as a candidate EMG sensor set. For example, when the wearable device 110 identifies a first EMG sensor combination of {1, 2, 4} and a second EMG sensor combination of {2, 3, 5}, based on the anatomy information 1030, and a third EMG sensor combination of {1, 5, 7} and a fourth EMG sensor combination of {2, 3, 5}, based on the candidate sensor statistics information 1040, the wearable device 110 may select second, third, and fifth EMG signals, as a candidate EMG sensor set, through an EMG sensor combination of {2,3,5} that are common to the anatomy information 1030 and the candidate sensor statistics information 1040. According to an embodiment of the disclosure, an EMG sensor combination included in at least one of the anatomy information 1030 or the candidate sensor statistics information 1040 may be selected as a candidate EMG sensor set. For example, a first candidate EMG sensor set may include first, second, and fourth EMG sensors, a second candidate EMG sensor set may include second, third, and fifth EMG sensors, and a third candidate EMG sensor set may include first, fifth, and seventh EMG sensors.

According to an embodiment of the disclosure, the candidate EMG sensor set selection unit 1020 may obtain user's wrist thickness information. The candidate EMG sensor set selection unit 1020 may select a candidate EMG sensor set by using at least one of the anatomy information 1030 corresponding to the obtained user's wrist thickness information or the candidate sensor statistics information 1040 corresponding to the obtained user's wrist thickness information.

Figure 11:
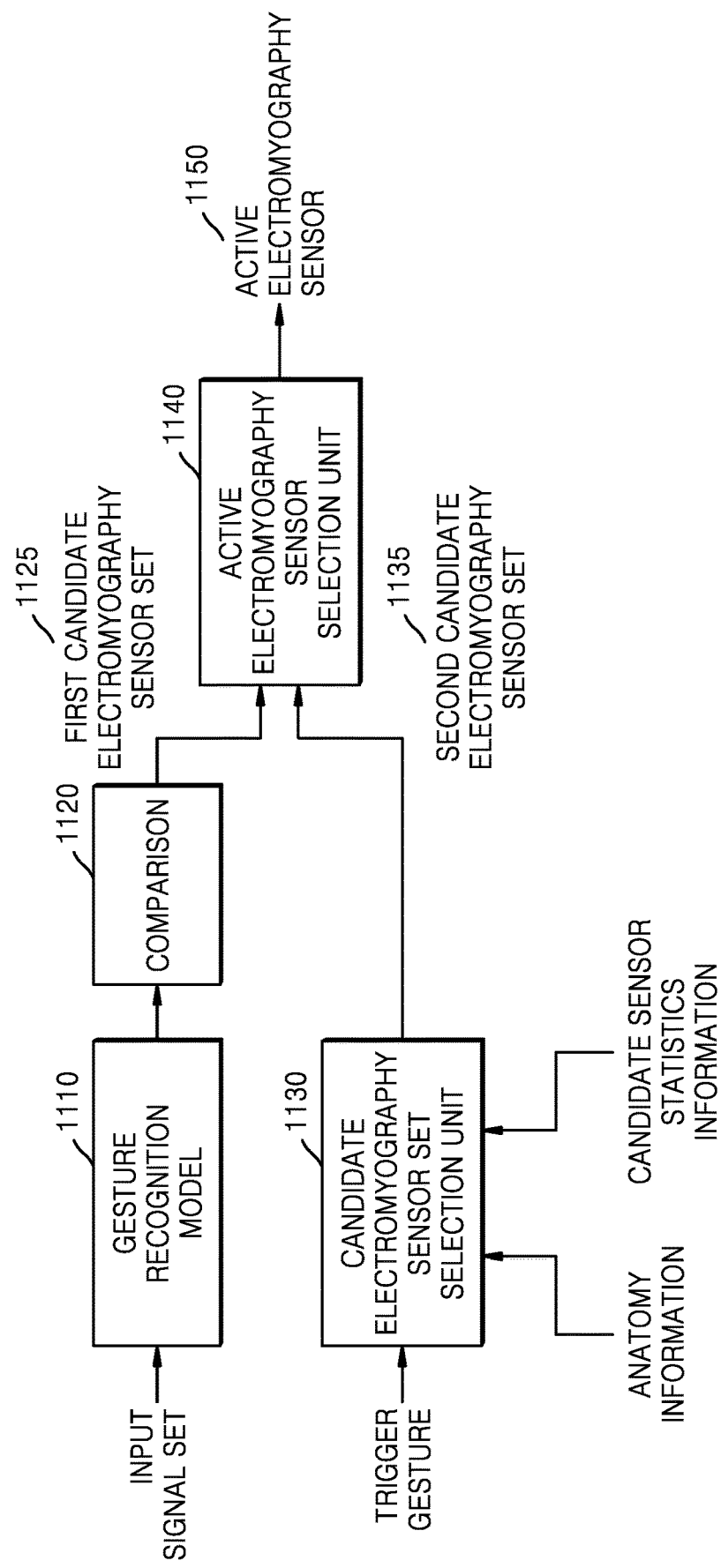
FIG. 11 is a block diagram showing an example process of selecting an active electromyography sensor, according to an embodiment of the disclosure.

FIG. 11 is a block diagram showing an example of selecting an active EMG sensor 1150, according to an embodiment of the disclosure.

Referring to FIG. 11, the wearable device 110 may select the active EMG sensor 1150 based on anatomy information and candidate sensor statistics information.

The wearable device 110 may obtain an EMG signal set through EMG sensors. The wearable device 110 may select an input signal set from an EMG signal set, and use the selected input signal set as an input to a gesture recognition model 1110. According to an embodiment of the disclosure, the wearable device 110 may select an input signal set by using a second candidate EMG sensor set. According to an embodiment of the disclosure, the wearable device 110 may select at least one first candidate EMG sensor set 1125 by comparing the output values of a gesture recognition model in a comparison operation 1120. For example, the wearable device 110 may identify an input signal set having an output value with respect to a trigger gesture is greater than or equal to a threshold value, and use the identified input signal set as the at least one first candidate EMG sensor set 1125.

According to an embodiment of the disclosure, the wearable device 110 may select at least one second candidate EMG sensor set 1135 through a candidate EMG sensor set selection unit 1130, based on the trigger gesture and at least one of anatomy information or candidate sensor statistics information. According to an embodiment of the disclosure, the selecting the at least one second candidate EMG sensor set 1135, by the wearable device 110, through the candidate EMG sensor set selection unit 1130 may be performed in the same manner as the selecting an active EMG sensor in FIG. 10.

According to an embodiment of the disclosure, an active EMG sensor selection unit 1140 may select the active EMG sensor 1150, based on the at least one first candidate EMG sensor set 1125 and the at least one second candidate EMG sensor set 1135. According to an embodiment of the disclosure, the active EMG sensor selection unit 1140 may select EMG sensors included in a third candidate EMG sensor set as the active EMG sensor 1150, based on the including the same third candidate EMG sensor set in each of the at least one first candidate EMG sensor set 1125 and the at least one second candidate EMG sensor set 1135. According to an embodiment of the disclosure, when there are a plurality of third candidate EMG sensor sets, by comparing prediction values with respect to a trigger gesture of each of the third EMG sensor set, EMG sensors included in an EMG sensor set having the greatest prediction value may be selected as the active EMG sensor 1150.

According to an embodiment of the disclosure, in FIGS. 6, 9A, and 9B, the operation of selecting an active EMG sensor by comparing the output values of a gesture recognition model in the comparison operations 650 and 940 is to select one of at least one candidate EMG sensor set, and may be one operation including the comparing the output values of the gesture recognition model 1110 of FIG. 11 in the comparison operation 1120, and the selecting an active EMG sensor by the active EMG sensor selection unit 1140, but the disclosure is not limited thereto.

Figure 12:
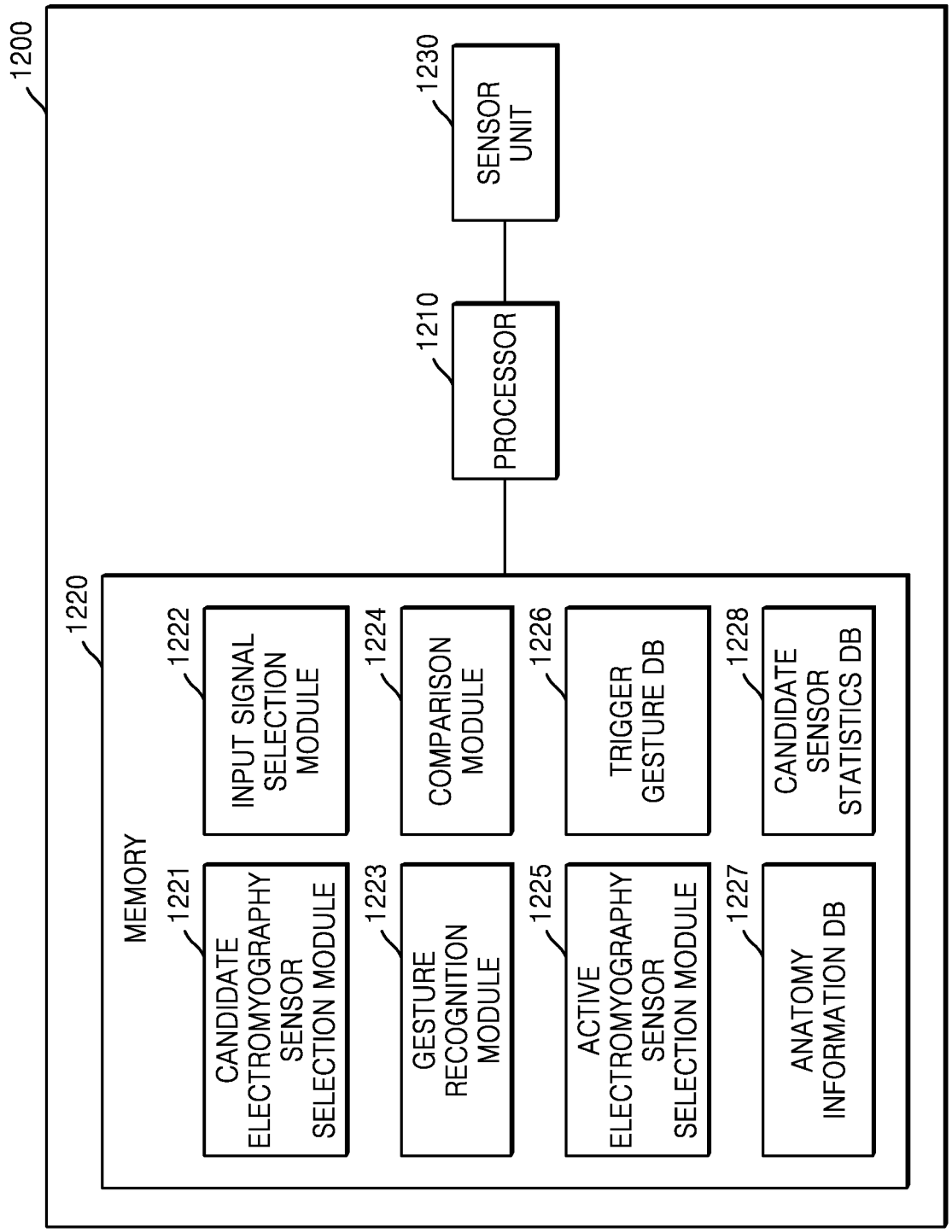
FIG. 12 is a block diagram showing the configuration of a wearable device according to an embodiment of the disclosure.

FIG. 12 is a block diagram showing the configuration of a wearable device 1200 according to an embodiment of the disclosure. The wearable device 1200 of FIG. 12 may correspond to the wearable device 110 of FIGS. 1 to 11 and the wearable device 110 of FIG. 13 described below.

The wearable device 1200 may include a processor 1210, a memory 1220, and a sensor unit 1230. The processor 1210 may perform a specific operation through the obtained signals through the sensor unit 1230, or store the obtained signals in the memory 1220. The memory 1220 may include data including instructions for the processor 1210 to select an active EMG sensor.

Programs stored in the memory 1220 may be classified into a plurality of modules, for example, a candidate EMG sensor selection module 1221, an input signal selection module 1222, a gesture recognition module 1223, a comparison module 1224, an active EMG sensor selection module 1225, and the like, according to a function thereof.

The processor 1210 may select a candidate EMG sensor set including at least some of a plurality of EMG sensors of the wearable device 1200, by executing the candidate EMG sensor selection module 1221. For example, a candidate EMG sensor set may be selected as at least one of a plurality of EMG sensors of the wearable device 1200, based on the trigger gesture and at least one of anatomy information or candidate sensor statistics information.

The processor 1210 may select, by executing the input signal selection module 1222, an input signal set including the EMG signals obtained through the candidate EMG sensor set, from an EMG signal set obtained through a plurality of EMG sensors of the wearable device 1200.

The processor 1210 may calculate, by executing the gesture recognition module 1223, a prediction value for each gesture by using an input signal set including at least one of EMG signals, as an input.

The processor 1210 may compare, by executing the comparison module 1224, the output values of a gesture recognition model with each other or with a threshold value.

The processor 1210 may select, by executing the active EMG sensor selection module 1225, one of a plurality of candidate EMG sensor sets based on a result of the comparison module 1224, and select the EMG sensors of the selected candidate EMG sensor set, as active EMG sensors.

The processor 1210 may load the data stored in the memory 1220, or store data in the memory 1220. The data stored in the memory 1220 may be classified into a plurality of databases (DB) according to information thereof, for example, a trigger gesture DB 1226, an anatomy information DB 1227, a candidate sensor statistics DB 1228, and the like.

The processor 1210 may identify the trigger gesture of the wearable device 1200 from the trigger gesture DB 1226. The processor 1210 may obtain anatomy information and candidate sensor statistics information used for the candidate EMG sensor selection module 1221, respectively from the anatomy information DB 1227 and the candidate sensor statistics DB 1228.

The sensor unit 1230 may include a plurality of EMG sensors and at least one of an acceleration sensor, a gyroscope sensor, or a geomagnetic sensor.

Figure 13:
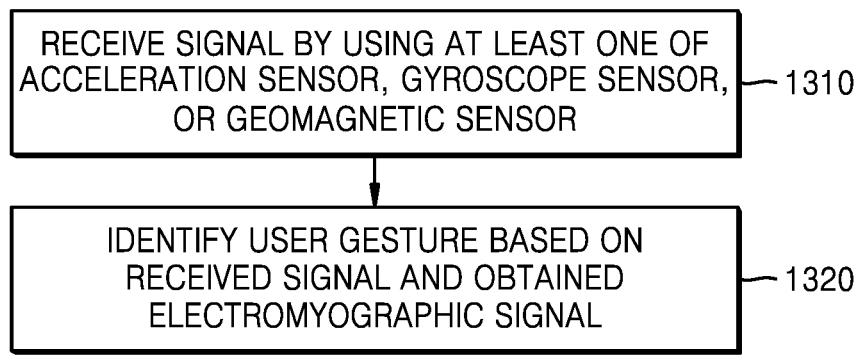
FIG. 13 is a flowchart of an exemplary method of recognizing a gesture by using a wearable device, according to an embodiment of the disclosure.

FIG. 13 is a flowchart of a method of recognizing a gesture by using the wearable device 110, according to an embodiment of the disclosure.

According to an embodiment of the disclosure, the wearable device 110 may further include at least one of an acceleration sensor, a gyroscope sensor, or a geomagnetic sensor.

In operation 1310, the wearable device 110 may receive at least one of acceleration information, gyroscope information, or geomagnetic information by using at least one of an acceleration sensor, a gyroscope sensor, or a geomagnetic sensor.

In operation 1320, the wearable device 110 may recognize a user gesture based on the obtained at least one signal. According to an embodiment of the disclosure, the wearable device 110 may recognize a user gesture based on the obtained at least one signal and the obtained EMG signals. According to an embodiment of the disclosure, the wearable device 110 may activate the active EMG sensors of the wearable device 110 based on the obtained at least one signal, and recognize a user gesture through the activated active EMG sensors.

FIG. 14 is a block diagram showing the configuration of a wearable device 2000 according to an embodiment of the disclosure. The wearable device 2000 of FIG. 14 may correspond to the wearable device 110 of FIGS. 1 to 11 and FIG. 13 and the wearable device 1200 of FIG. 12.

As illustrated in FIG. 14, the wearable device 2000 may include a user input unit 2100, an output unit 2200, a processor 2300, a sensor unit 2400, a communication unit 2500, an audio/video (A/V) input unit 2600, and a memory 2700. The processor 2300, the sensor unit 2400, and the memory 2700 of FIG. 14 may respectively correspond to the processor 1210, the sensor unit 1230, and the memory 1220 of FIG. 12.

The user input unit 2100 may mean a device to input data so that a user controls the wearable device 2000. For example, the user input unit 2100 may include a dome switch, a touch pad (a contact capacitance method, a pressure resistance film method, an infrared sensing method, a surface ultrasound conduction method, an integral tension measurement method, a piezo effect method, and the like), a jog wheel, a jog switch, and the like, but the disclosure is not limited thereto.

The user input unit 2100 may receive a user input to select a trigger gesture.

The output unit 2200 may output an audio signal, a video signal, or a vibration signal, and may include a display unit 2210, a sound output unit 2220, and a vibration motor 2230.

The display unit 2210 displays and outputs information processed in the wearable device 2000. For example, the display unit 2210 may display a gesture list including a plurality of gestures so that a user selects a trigger gesture.

When the display unit 2210 and a touchpad form a layer structure and are configured as a touch screen, the display unit 2210 may be used not only as an output device, but also as an input device. The display unit 2210 may include at least one of a liquid crystal display, a thin film transistor-liquid crystal display, an organic light-emitting diode, a flexible display, a three-dimensional (3D) display, or an electrophoretic display.

The sound output unit 2220 may output audio data received from the communication unit 2500 or stored in the memory 2700. The vibration motor 2230 may output a vibration signal.

The processor 2300 may typically control the overall operation of the wearable device 2000. For example, the processor 2300 may control, by executing programs stored in the memory 2700, the user input unit 2100, the output unit 2200, the sensor unit 2400, the communication unit 2500, and the A/V input unit 2600. The processor 2300 may perform, by controlling the user input unit 2100, the output unit 2200, the sensor unit 2400, the communication unit 2500, and the A/V input unit 2600, the operation of the wearable device 2000 in the disclosure.

In detail, the processor 2300 may select an active EMG sensor. The processor 2300 may obtain an EMG signal set and select an active EMG sensor based on the obtained EMG signal set, to select an active EMG sensor to be activated when the wearable device 2000 is in a standby mode.

The processor 2300 may receive information about a trigger gesture from an external electronic apparatus.

The processor 2300 may identify information about a trigger gesture of the wearable device 2000. The processor 2300 may obtain an EMG signal set from a plurality of EMG sensors 2410, based on the movement of a user's body for the identified trigger gesture. The processor 2300 may obtain at least one output value by using at least some of the obtained EMG signal set, as an input to a gesture recognition model. The processor 2300 may select at least one active EMG sensor to recognize a user gesture when the wearable device 2000 is in a standby mode, based on the obtained at least one output value. The processor 2300 may recognize a user gesture by using at least one active EMG sensor that is activated, when the wearable device 2000 is in a standby mode.

The processor 2300 may identify a trigger gesture selected from among a plurality of trigger gestures based on a user input.

The processor 2300 may compare the recognized gesture with the trigger gesture. The processor 2300 may activate at least one active EMG sensor selected from among a plurality of EMG sensors and the other sensors together, based on the recognized gesture corresponding to the trigger gesture.

The processor 2300 may obtain user's wrist thickness information. The processor 2300 may select a gesture recognition model corresponding to obtained wrist thickness information, from among a plurality of gesture recognition models. The processor 2300 may input at least some of the obtained EMG signal set to the selected gesture recognition model.

The processor 2300 may select at least one candidate EMG sensor set from among a plurality of EMG sensors. The processor 2300 may select at least one input signal set from the EMG signal set. The processor 2300 may obtain at least one output value by inputting the selected at least one input signal set to the gesture recognition model. The processor 2300 may select one of the at least one candidate EMG sensor set based on the obtained at least one output value. The processor 2300 may select at least one EMG sensor included in the selected one candidate EMG sensor set, as the at least one active EMG sensor.

The processor 2300 may obtain at least one piece of information among human anatomy information or signal statistics information for each gesture. The processor 2300 may select at least one candidate EMG sensor set from among a plurality of EMG sensors based on the obtained information.

The processor 2300 may calculate reliability of at least one candidate EMG sensor set based on the obtained at least one output value. The processor 2300 may select one of at least one candidate EMG sensor set based on the reliability.

The sensor unit 2400 may detect a user's state of using the wearable device 2000, a state of the wearable device 2000, or a state around the wearable device 2000, and transmit the detected information to the processor 2300.

The sensor unit 2400 may include at least one of an EMG sensor 2410, an acceleration sensor 2420, a temperature/humidity sensor 2430, an infrared sensor 2440, a gyroscope sensor 2450, a position sensor, for example, GPS, 2460, a barometric pressure sensor 2470, a proximity sensor 2480, an RGB sensor (illuminance sensor) 2490, and a geomagnetic sensor 2495, but the disclosure is not limited thereto. As the function of each sensor is intuitively inferable from the name thereof by a person skilled in the art, detailed descriptions thereof are omitted.

The communication unit 2500 may include one or more constituent elements for communication with an external electronic apparatus. For example, the communication unit 2500 may include a short-range wireless communication unit 2510, a mobile communication unit 2520, and a broadcast receiving unit 2530.

The short-range wireless communication unit 2510 may include a Bluetooth communication unit, a Bluetooth low energy (BLE) communication unit, a near field communication unit, a WLAN (Wi-Fi) communication unit, a Zigbee communication unit, an infrared data association (IrDA) communication unit, a WFD (Wi-Fi Direct) communication unit, an ultra-wideband (UWB) communication unit, an ant+ communication unit, and the like, but the disclosure is not limited thereto.

The mobile communication unit 2520 transmit/receive wireless signals with at least one of a base station, an external terminal, or a server on a mobile communication network. The wireless signal may include a voice call signal, a video call signal, or various types of data according to transmission/receiving of a text/multimedia message.

The broadcast receiving unit 2530 may externally receive a broadcast signal and/or broadcast related information through a broadcast channel. The broadcast channel may include a satellite channel and a terrestrial channel. In some embodiments, the wearable device 2000 may not include the broadcast receiving unit 2530.

Furthermore, the communication unit 2500 may transmit/receive information needed to identify a trigger gesture to/from the external electronic apparatus.

The A/V input unit 2600 for inputting an audio signal or a video signal may include a camera 2610, a microphone 2620, and the like. The camera 2610 may obtain an image frame such as a still image or a video, and the like from a video call mode or a photography mode. An image captured through an image sensor may be processed through the processor 2300 or a separate image processing unit (not shown).

An image frame processed by the camera 2610 may be stored in the memory 2700 or transmitted to the outside through the communication unit 2500. The camera 2610 may include two or more cameras according to a configuration type of a terminal. In some embodiments, the wearable device 2000 may not include the camera 2610.

The microphone 2620 may receive an external sound signal and process the received signal to electrical sound data. For example, the microphone 2620 may receive a sound signal from an external device or a speaker. The microphone 2620 may use various noise removal algorithms to remove noise occurring in the process of receiving an external sound signal.

The memory 2700 may store a program for processing and controlling the processor2300, and pieces of data input to the wearable device 2000 or output from the wearable device 2000.

The memory 2700 may include a storage medium of at least one type of a flash memory type, a hard disk type, a multimedia card micro type, a card type memory, for example, SD or XD memory, and the like, random access memory (RAM) static random access memory (SRAM), read-only memory (ROM), electrically erasable programmable read-only memory (EEPROM), programmable read-only memory (PROM), magnetic memory, a magnetic disc, an optical disc, or the like.

The programs stored in the memory 2700 may be classified into a plurality of modules according to a function thereof, for example, a UI module 2710, a touch screen module 2720, a notification module 2730, and the like.

The UI module 2710 may provide UI, GUI, and the like, which are specialized in association with the wearable device 2000 for each application. The touch screen module 2720 may detect a touch gesture by a user on a touch screen, and transmit information about the touch gesture to the processor 2300. The touch screen module 2720 according to some embodiments may recognize and analyze touch code. The touch screen module 2720 may be configured by separate hardware including a controller.

The notification module 2730 may generate a signal to notify an occurrence of an event of the wearable device 2000.

A function related to artificial intelligence according to the disclosure is operated through a processor and a memory. The processor may include one or a plurality of processors. In this state, one or a plurality of processors may include a general purpose processor such as a CPU, an AP, a digital signal processor (DSP), and the like, a graphics dedicated processor such as a GPU or a vision processing unit (VPU), or an artificial intelligence (AI) dedicated processor such as an NPU The one or a plurality of processors may control and process input data according to an AI model or a predefined operation rule stored in the memory. When the one or a plurality of processor is an AI dedicated processor, the AI dedicated processor may be designed in a hardware structure specified to the process of a specific AI model.

The predefined operation rule or AI model is characteristically made through training. The being made through training may mean that, as a basic AI model is trained using a plurality of pieces of training data by a learning algorithm, the predefined operation rule or AI model set to perform a desired feature or purpose is made. The training may be made in a device for performing AI according to the disclosure, and may be made through a separate server and/or system. Examples of the learning algorithm may include supervised learning, unsupervised learning, semi-supervised learning, or reinforcement learning, but the disclosure is not limited thereto.

The AI model may include a plurality of neural network layers. Each of a plurality of neural network layers may have a plurality of weight values, and perform a neural network operation through an operation result of a previous layer and an operation between a plurality of weight values. The weight values of the neural network layers may be optimized by a training result of the AI model. For example, a plurality of weight values may be updated such that a loss value or a cost value obtained from the AI model during a training process is reduced or minimized. An artificial neural network may include, for example, a CNN, a DNN, an RNN, a restricted Boltzmann machine (RBM), a deep belief network (DBN), a bidirectional recurrent deep neural network (BRDNN), a deep Q-network, or the like, but the disclosure is not limited thereto.

A device-readable storage medium may be provided in the form of a non-transitory storage medium. The non-transitory may mean that a storage medium is a tangible device, not including a signal, for example, an electromagnetic wave. However, the term does not distinguish a case of semi-permanently storing data in a storage medium from a case of temporarily storing data. For example, the "non-transitory storage medium" may include a buffer for temporarily storing data.

According to an embodiment of the disclosure, a method according to an embodiment of the disclosure disclosed in this document may be provided by being included in a computer program product. A computer program product as goods may be dealt between a seller and a buyer. The computer program product is distributed in the form of a machine-readable storage medium, for example, a compact disc read only memory (CD-ROM), or through application stores, or can be distributed directly or online, for example, download or upload, between two user devices, for example, smart phones. In the case of online distribution, at least a part of the computer program product may be at least temporarily stored or temporarily generated in a machine-readable storage medium such as a manufacturer's server, an application store's server, or a memory of a relay server.

Furthermore, in the disclosure, a "unit" may include a hardware component, such as a processor or a circuit, and/or a software component executed by the hardware component such as a process.

Furthermore, in the disclosure, expressions such as "at least one of a, b, or c" may denote "a", "b", "c", "a and b", "a and c", "b and c", "all of a, b, and c", or modifications thereof.

The above descriptions of the disclosure is for an example, and it will be understood that one of ordinary skill in the art to which the disclosure pertains can easily modify the disclosure into other detailed form without changing the technical concept or essential features of the disclosure. Thus, the above-described embodiments are exemplary in all aspects and should not be for purposes of limitation. For example, each constituent element described to be a single type may be embodied in a distributive manner. Likewise, the constituent elements described to be distributed may be embodied in a combined form.

The scope of the disclosure is defined not by the detailed description of the disclosure but by the appended claims, and all changes and modifications introduced from the concept and scope of the claims and the equivalent concept thereof will be construed as being included in the disclosure.

The invention claimed is:

1. A method of recognizing, by a wearable device, a user gesture, the method comprising:
   identifying a trigger gesture of the wearable device, the trigger gesture being a gesture that activates one or more inactive electromyography sensors;
   obtaining an electromyographic signal set from a plurality of electromyography sensors, based on a movement of a user's body for the identified trigger gesture;
   obtaining at least one output value by using one or more electromyographic signals from among the obtained electromyographic signal set, as an input to a gesture recognition model;

selecting, based on the obtained at least one output value, at least one active electromyography sensor to recognize the user gesture when the wearable device is in a standby mode;

activating the selected at least one active electromyography sensor based on the wearable device being in the standby mode;

recognizing the user gesture by using the activated at least one active electromyography sensor based on the wearable device being in the standby mode; and activating the selected at least one active electromyography sensor and other electromyography sensors together among the plurality of electromyography sensors, based on a comparison between the recognized user gesture and the trigger gesture.

2. The method of claim 1, wherein the identifying of the trigger gesture comprises identifying the trigger gesture from among a plurality of trigger gestures, based on an input from a user.

3. The method of claim 1, further comprising:
comparing the recognized user gesture with the trigger gesture.

4. The method of claim 1, further comprising obtaining user's wrist thickness information.

5. The method of claim 4, further comprising selecting the gesture recognition model corresponding to the obtained wrist thickness information from among a plurality of gesture recognition models,
wherein the obtaining of the at least one output value comprises inputting the one or more electromyographic signals from among the obtained electromyographic signal set to the selected gesture recognition model.

6. The method of claim 1, wherein the gesture recognition model comprises an artificial intelligence model trained to recognize a gesture using training data, and wherein the training data comprises one or more electromyographic signal sets collected to correspond to a plurality of gestures.

7. The method of claim 1, wherein the obtaining of the at least one output value comprises:
selecting at least one candidate electromyography sensor set from among the plurality of electromyography sensors;
selecting at least one input signal set from the electromyographic signal set; and
obtaining the at least one output value by inputting the selected at least one input signal set to the gesture recognition model, and
wherein each of the at least one input signal set comprises at least one electromyographic signal obtained from the at least one candidate electromyography sensor set.

8. The method of claim 7, wherein the selecting of at least one active electromyography sensor comprises:
selecting one of the at least one candidate electromyography sensor set, based on the obtained at least one output value; and
selecting at least one electromyography sensor included in the selected one candidate electromyography sensor set, as the at least one active electromyography sensor.

9. The method of claim 7, wherein the selecting of the at least one candidate electromyography sensor set comprises:
obtaining at least one of human anatomy information or signal statistics information for each gesture; and
selecting the at least one candidate electromyography sensor set from among the plurality of electromyography sensors, based on the obtained information.

10. The method of claim 8, wherein the selecting of one of the at least one candidate electromyography sensor set comprises:
calculating reliability of the at least one candidate electromyography sensor set, based on the obtained at least one output value; and
selecting the one of the at least one candidate electromyography sensor set, based on the reliability.

11. A wearable device worn by a user and configured to recognize a user gesture, the wearable device comprising:
a plurality of electromyography sensors;
a memory storing one or more instructions; and
a processor configured to:
identify a trigger gesture of the wearable device, the trigger gesture being a gesture that activates one or more inactive electromyography sensors;
obtain a electromyographic signal set from the plurality of electromyography sensors, based on a movement of the user's body for the identified trigger gesture;
obtain at least one output value by using one or more electromyographic signals from among the obtained electromyographic signal set, as an input to a gesture recognition model;
select, based on the obtained at least one output value, at least one active electromyography sensor to recognize the user gesture when the wearable device is in a standby mode;
control to activate the selected at least one active electromyography sensor based on the wearable device being in the standby mode;
recognize the user gesture by using the activated at least one active electromyography sensor based on the wearable device being in the standby mode; and
activate the selected at least one active electromyography sensor and other electromyography sensors together among the plurality of electromyography sensors, based on a comparison between the recognized user gesture and the trigger gesture.

12. The wearable device of claim 11, wherein the processor is further configured to identify the trigger gesture from among a plurality of trigger gestures, based on an input from the user.

13. The wearable device of claim 11, wherein the processor is further configured to:
compare the recognized user gesture with the trigger gesture.

14. The wearable device of claim 11, wherein the processor is further configured to obtain user's wrist thickness information.

15. The wearable device of claim 14, wherein the processor is further configured to:
select the gesture recognition model corresponding to the obtained wrist thickness information from among a plurality of gesture recognition models; and
input the one or more electromyographic signals from among the obtained electromyographic signal set to the selected gesture recognition model.

16. The wearable device of claim 11, wherein the gesture recognition model comprises an artificial intelligence model trained to recognize a gesture using training data, and wherein the training data comprises one or more electromyographic signal sets collected to correspond to a plurality of gestures.

17. The wearable device of claim 11, wherein the processor is further configured to:
select at least one candidate electromyography sensor set from among the plurality of electromyography sensors;

select at least one input signal set from the electromyographic signal set; and obtain the at least one output value by inputting the selected at least one input signal set to the gesture recognition model, and wherein each of the at least one input signal set comprises at least one electromyographic signal obtained from the at least one candidate electromyography sensor set.

18. The wearable device of claim 17, wherein the processor is further configured to:

select one of the at least one candidate electromyography sensor set, based on the obtained at least one output value; and select at least one electromyography sensor included in the selected one candidate electromyography sensor set, as the at least one active electromyography sensor.

19. The wearable device of claim 17, wherein the processor is further configured to:

obtain at least one of human anatomy information or signal statistics information for each gesture; and select the at least one candidate electromyography sensor set from among the plurality of electromyography sensors, based on the obtained information.

20. A non-transitory computer-readable recording medium having recorded thereon a program for executing, on a computer, the method of claim 1.

* * * * *